United States Patent
Chung et al.

(10) Patent No.: US 11,385,839 B1
(45) Date of Patent: Jul. 12, 2022

(54) IMPLEMENTING A READ SETUP IN 3D NAND FLASH MEMORY TO REDUCE VOLTAGE THRESHOLD DEVIATION OVER TIME

(71) Applicant: MACRONIX INTERNATIONAL CO., LTD., Hsinchu (TW)

(72) Inventors: Chin-Chu Chung, Hsinchu (TW); Chien-Hsin Liu, Hsinchu (TW); Yu-Chih Yeh, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/242,123

(22) Filed: Apr. 27, 2021

(51) Int. Cl.
G06F 3/06 (2006.01)

(52) U.S. Cl.
CPC ............ G06F 3/0659 (2013.01); G06F 3/064 (2013.01); G06F 3/0625 (2013.01); G06F 3/0679 (2013.01)

(58) Field of Classification Search
CPC ...... G06F 3/0625; G06F 3/064; G06F 3/0659; G06F 3/0679
See application file for complete search history.

(56) References Cited

U.S. PATENT DOCUMENTS

| | | | |
|---|---|---|---|
| 9,230,665 B2 | 1/2016 | Hosono | |
| 10,211,218 B2 | 2/2019 | Lue | |
| 10,360,101 B2* | 7/2019 | Kodama | ................ G11C 16/26 |
| 10,521,287 B2 | 12/2019 | Khoueir et al. | |
| 11,270,776 B1 | 3/2022 | Lien et al. | |
| 2002/0039311 A1 | 4/2002 | Takeuchi et al. | |
| 2005/0146959 A1 | 7/2005 | Shiga | |
| 2014/0016413 A1 | 1/2014 | Han et al. | |
| 2016/0179402 A1* | 6/2016 | Iwashiro | ................ G06F 3/0688 711/103 |
| 2016/0205054 A1* | 7/2016 | Lu | ......................... H04L 51/214 709/206 |
| 2017/0185299 A1 | 6/2017 | Conley et al. | |
| 2020/0012598 A1 | 1/2020 | Feng et al. | |

(Continued)

FOREIGN PATENT DOCUMENTS

TW 202038232 A 10/2020

OTHER PUBLICATIONS

U.S. Office Action in U.S. Appl. No. 17/234,236 dated Apr. 19, 2022, 16 pages.

(Continued)

*Primary Examiner* — Larry T Mackall

(74) *Attorney, Agent, or Firm* — Andrew L. Dunlap; Haynes Beffel & Wolfeld LLP

(57) ABSTRACT

A method of operating a memory is provided. The method includes, in response to an access of a block of memory updating a first queue to identify the accessed block in response to a determination that the block is not already identified in the first queue and a determination that the block is not already identified in a second queue, and updating the second queue to identify the accessed block of memory in response to a determination that the block is already identified in the first queue. The method further includes scanning the second queue to identify, as a read setup candidate, each block of the memory that is identified as present in the second queue longer than a threshold, and performing a read setup operation on a block of memory that has been identified as the read setup candidate.

20 Claims, 14 Drawing Sheets

(56) References Cited

U.S. PATENT DOCUMENTS

2020/0226080 A1    7/2020  Tarango et al.
2021/0366561 A1   11/2021  Senoo
2022/0028460 A1*   1/2022  Kurose ................... G06F 3/064

OTHER PUBLICATIONS

U.S. Office Action in U.S. Appl. No. 17/153,525 dated Mar. 31, 2022, 12 pages.
Spinelli, et al., "Reliability of NAND Flash Memories: Planar Cells and Emerging Issues in 3D Devices," Computers. 2017; 6(2), Apr. 21, 2017, 55 pages.
Zambelli, et al., "First Evidence of Temporary Read Errors in TLC 3D-NAND Flash Memories exiting from an Idle State," IEEE J. of the Electron Devices Society, vol. 8, Jan. 10, 2020, 6 pages.

\* cited by examiner

500

IMPLEMENTING A READ SETUP IN 3D NAND FLASH MEMORY TO REDUCE VOLTAGE THRESHOLD DEVIATION OVER TIME

BACKGROUND

Field

The technology disclosed relates to integrated circuit memory, including nonvolatile 3D NAND flash memory and operating the same. In particular, the technology disclosed relates to performing a read setup in 3D NAND flash memory to reduce voltage threshold distribution deviation over time.

Description of Related Art

3D NAND flash memory suffers a problem in that threshold voltages of cells can deviate over time, eventually and unintentionally changing logical states of cells. For example, this deviation of the threshold voltage can happen to a particular row of cells as a result of reading data from another row of cells. While error correcting codes (ECC) can be implemented to correct for read errors that occur as a result of the unintentional change of the logical states of the cells, error correction has limited capabilities.

Therefore, it is desirable to prevent the deviation of the threshold voltages of cells of 3D NAND flash memory.

SUMMARY

The technology disclosed describes a method of operating a memory that implements a read setup to reduce voltage threshold deviation over time. The technology disclosed also describes a memory (e.g., 3D NAND flash memory) including control circuits that perform a read setup operation that reduces voltage threshold deviation over time.

In an embodiment, a method is provided, which includes in response to an access of a block of memory (i) updating a first queue to identify the accessed block of memory in response to a determination that the block of memory is not already identified in the first queue and a determination that the block of memory is not already identified in a second queue, and (ii) updating the second queue to identify the accessed block of memory in response to a determination that the block of memory is already identified in the first queue. The method further includes scanning the second queue to identify, as a read setup candidate, each block of the memory that is identified as present in the second queue longer than a predetermined threshold, and performing a read setup operation on a block of the memory that has been identified as the read setup candidate.

According to an embodiment, upon the second queue being updated to identify the accessed block of memory, the method can further include remove an identifier of the block of memory from the first queue. The method can further include, in response to the access of the block of memory and in response to a determination that the block of memory is not identified in the first queue and a determination that the block of memory is already identified in the second queue, updating a position of an identifier of the block in the second queue. Further, first queue can be a first-in first-out (FIFO) queue. Additionally, the second queue can be a least recently used (LRU) queue that is a linked list, and the updating of the second queue to identify the accessed block of memory can update linked list pointers of the second queue to (i) move positions of identifiers of other blocks of the memory identified in the second queue towards a front of the second queue and (ii) position the identifier of the accessed block of the memory at a backmost location of the second queue.

According to an embodiment, the first queue and the second queue can be of the same size or the first queue and the second queue can be of a different size. Also, the scanning of the second queue can be periodically initiated according to a predetermined time interval. Each respective identifier of the blocks identified in the second queue can be associated with a corresponding timestamp that is set relative to a time at which a corresponding block has been accessed, and the scanning of the second queue can include identifying a particular block of the memory, as identified in the second queue, as a read setup candidate when the timestamp of the particular block indicates that the particular block has been identified in the second queue longer than the predetermined threshold. The method can also include recording the identifier of the particular block identified as the read setup candidate in a read setup list, and performing the read setup operation on one or more blocks identified in the read setup list including the particular block. The method can further include the scanning of the second queue being performed starting from a frontmost position of the second queue and proceeding, in order, to a backmost position of the second queue, and wherein the performing of the read setup operation on the one or more blocks identified in the read setup list can be performed after all positions of the second queue have been scanned. Additionally, the method can include maintaining a read setup permitted list to identify blocks of the memory for which a number of errors has been detected using an error correction code (ECC) that is greater than a predetermined ECC threshold, determining which of the identified read setup candidates is listed in the read setup permitted list, prior to the performing of the read setup operation, and performing the read setup operation only on the read setup candidates determined to be listed in the read setup permitted list. Also, the method can include maintaining a read setup permitted list that can identify blocks of the memory that have been through a program and erase (PE) cycle a number of times that is greater than a predetermined PE cycle threshold, determining which of the identified read setup candidates is listed in the read setup permitted list, prior to the performing of the read setup operation, and performing the read setup operation only on the read setup candidates determined to be listed in the read setup permitted list. The method can also include in response to the access of the block of memory, detecting that a number of errors has been detected for the block, using an error correction code (ECC), that is greater than a predetermined ECC threshold, and identifying the block of memory as the read setup candidate, regardless of whether the block of memory is identified in the first queue or the second queue. The method can further include in response to the access of the block of memory, detecting that the block has been through a program and erase (PE) cycle a number of times that is greater than a predetermined PE cycle threshold, and identifying the block of memory as the read setup candidate, regardless of whether the block of memory is identified in the first queue or the second queue. The method may also include in response to the access of the block of memory, detecting that a number of errors has been detected for the block, using an error correction code (ECC), that is greater than a predetermined ECC threshold, and identifying the block of memory as the read setup candidate during the scanning, regardless of whether the block of memory is identified as present in the second queue longer than a predetermined threshold.

In another embodiment, a memory controller is provided, the memory controller can control a memory which includes a memory array, comprising a plurality of blocks. The memory controller can include control circuits comprising logic to execute operations. The operations can include, in response to an access of a block of memory (i) updating a first queue to identify the accessed block of memory in response to a determination that the block of memory is not already identified in the first queue and a determination that the block of memory is not already identified in a second queue, and (ii) updating the second queue to identify the accessed block of memory in response to a determination that the block of memory is already identified in the first queue. The operations can further include scanning the second queue to identify, as a read setup candidate, each block of the memory that is identified as present in the second queue longer than a predetermined threshold, and performing a read setup operation a block of the memory that has been identified as the read setup candidate.

In further embodiments, the operations performed by the control logic of the memory can include any of the method steps performed by the method of operating the memory, as described above.

In another embodiment a method of operating a memory is provided. The method can include maintaining a read setup permitted list to identify blocks of the memory in dependence upon their use. The method can further include in response to an access of a block of the memory (i) determining that the accessed block of the memory is included in the read setup permitted list, and (ii) in response to the determination that the accessed block of the memory is included in the read setup permitted list, identifying the accessed block of the memory as a read setup candidate. The method can also include performing a read setup operation on the block of the memory that has been identified as the read setup candidate. Moreover, the read setup permitted list can identify at least one of (i) blocks of the memory for which a number of errors has been detected using an error correction code (ECC) that is greater than a predetermined ECC threshold and (ii) blocks of the memory that have been through a program and erase (PE) cycle a number of times that is greater than a predetermined PE cycle threshold.

Other aspects and advantages of the technology disclosed can be seen on review of the drawings, the detailed description and the claims, which follow.

DETAILED DESCRIPTION

A detailed description of embodiments of the technology disclosed is provided with reference to the FIGS. 1-14.

Figure 1:
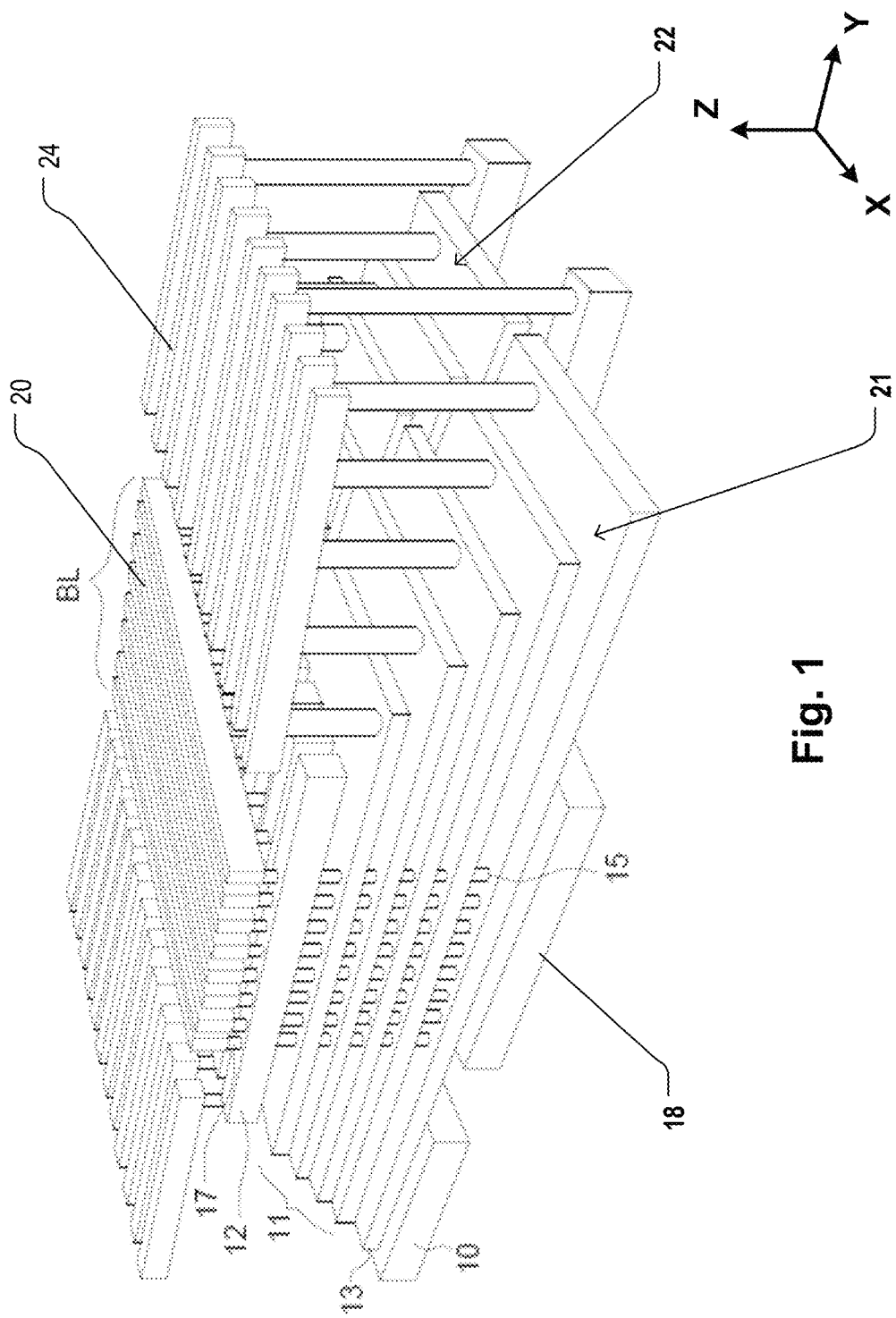
FIG. 1 is a perspective view of a 3D vertical NAND structure, having a block and sub-block architecture.

FIG. 1 is a perspective view of a 3D semiconductor device including a plurality of blocks and sub-blocks of memory cells in a plurality of vertical NAND strings. It comprises a multilevel stack of word line layers 11 configured as a first stack 21 of word line layers and a second stack 22 of word line layers, each parallel to the substrate 10, and a plurality of pillars 15 oriented orthogonally to the substrate in the Z direction as labeled in this figure extending through corresponding stacks of word line layers. The pillars comprise respective semiconductor bodies providing channels, which can be thin film channels less than 10 nm thick, of a plurality of series-connected memory cells located at cross-points between the pillars and the word lines in a NAND string configuration. A plurality of string select lines (SSLs) 12 is oriented parallel to the substrate in the Y direction, as labeled in this figure, and above the word line layers 11. In this example, first and second blocks of memory cells are formed in the first stack 21 and in the second stack 22, respectively, each coupled to different sets of NAND strings. Each of the string select lines intersects a respective distinct subset (e.g., one or more rows) of the set of pillars in a corresponding block, where each sub-block of memory cells in the corresponding block is formed in a subset of pillars coupled to a respective string select line.

The structure also includes a plurality of parallel global bit line conductors 20 in a layer parallel to the substrate extending in the X direction as labeled in this figure, and above the string select lines. Each of the global bit line conductors superposes a respective column of the pillars in the array across multiple blocks, each column including one pillar in each subset of pillars for each string select line.

Each intersection of a pillar and a string select line defines a select gate of the pillar for connection to a corresponding bit line. Each of the pillars underlies and is coupled by the select gate of the pillar to one of the bit line conductors.

Lower select lines (lower SG) 13 are formed under the word line layers 11 to couple the pillars to one or more source lines such as a common source conductor 18. The common source conductor can be connected to bias circuitry by vertical connections between the blocks, or otherwise.

The structure of FIG. 1 is one example of a memory including a plurality of blocks of memory cells and a plurality of bit lines, each block including a group of word lines (i.e., a stack in FIG. 1), and a set of NAND strings having string select gates for connection to corresponding bit lines in the plurality of bit lines, and in which each NAND string in the set of NAND strings of the block is connected to the group of word lines. Also, it is an example of a memory in which each block in the plurality of blocks of memory cells has a plurality of sub-blocks, each sub-block including a distinct subset of the set of NAND strings of the block. Also, in this example, the distinct subset of NAND strings in each sub-block is operatively connected to a respective sub-block string select line by which gate voltages are applied to the string select gates of the NAND strings in the distinct subset of the sub-block.

In structures like that illustrated in FIG. 1, an operation can be applied to limit the impact of the changing resistivities of channel semiconductor materials over time. For example, in some memory architectures when programming the memory cells, the channel polysilicon is stressed so that the thresholds set by the program are based on the stressed condition resistivities. To address this issue, a stress read bias can be applied to stress memory cells to be read. After the stress read, the channel can maintain the stressed condition for an interval of time, such as 10 minutes or so. So, the cell may be read within that interval without requiring another stress read bias.

Figure 2:
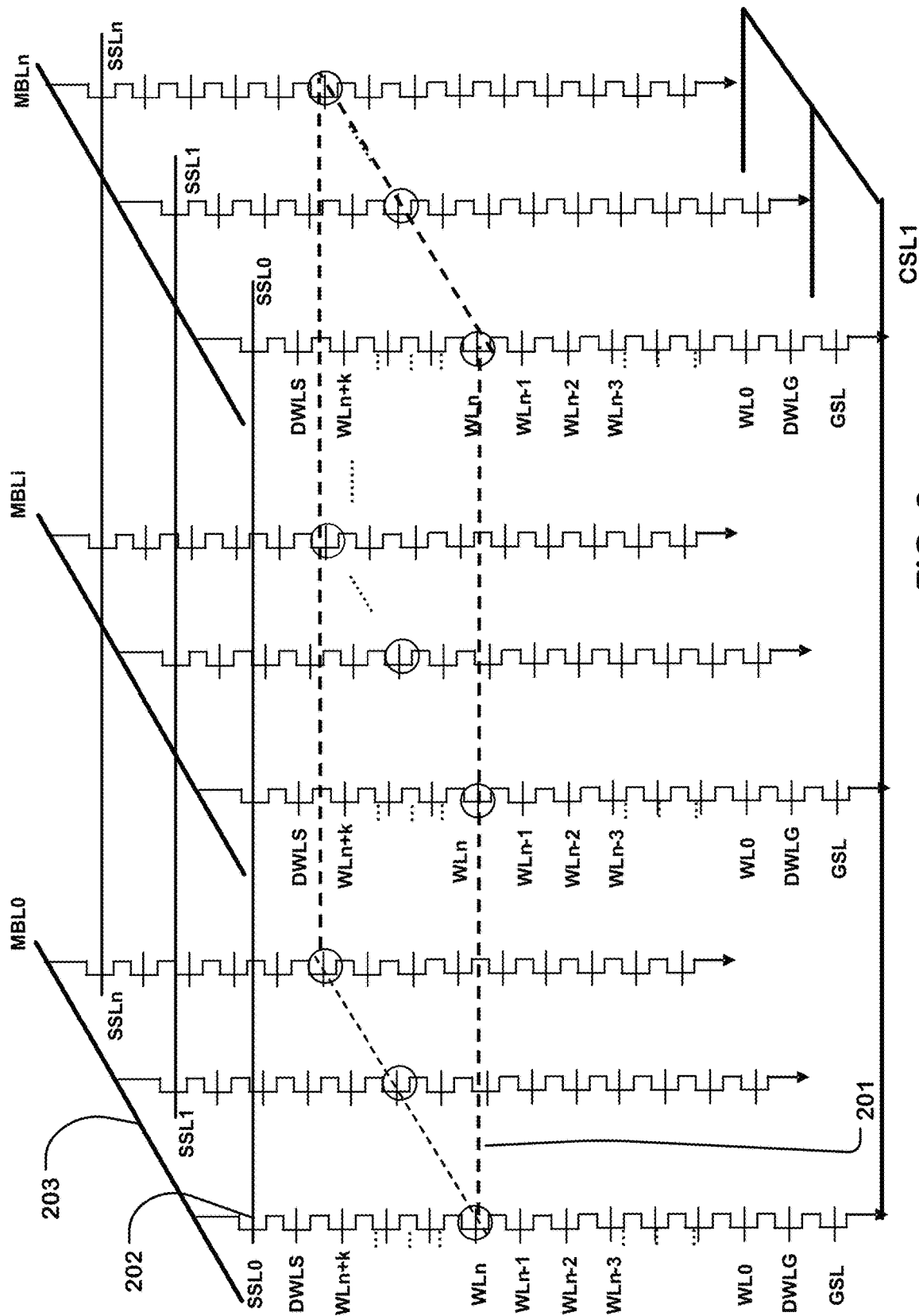
FIG. 2 is a circuit schematic diagram of a block of NAND flash memory cells, which can be implemented using an architecture like that of FIG. 1.

FIG. 2 is a schematic diagram of a block of memory cells in a 3D NAND device which can comprise many blocks, and in which a block includes a plurality of sub-blocks. In the schematic, a plurality of global bit lines MBL0 to MBLn overlies an array of NAND strings arranged in rows and columns. Each of the NAND strings comprises a series-connected string of memory cells, such as dielectric charge trapping memory cells, between a corresponding bit line and a reference line such as the common source line CSL. In some embodiments, the common source line for a block can be implemented as one or more reference lines, and may be coupled to biasing circuitry by which operating voltages are applied in various operations of the memory.

In a 3D NAND arrangement, the set of NAND strings of the block shown in FIG. 2 correspond with pillars of FIG. 1, for example. The NAND strings of the plurality of NAND strings are coupled with a corresponding stack of word lines WL0 to WLn+k, in which each word line is coupled to memory cells at its layer, in all the NAND strings in the block, in this example. At word line WLn, the planar structure of each of the word line layers is represented by the dashed line 201. Thus, all the memory cells in the block at the level of a given word line, such as WLn, in the block are coupled to that given word line, such as WLn, so that they can be activated by voltages applied to the given word line.

Also, each of the NAND strings includes a corresponding sub-block string select gate (e.g., 202) configured to connect the NAND string to a particular bit line (e.g., 203) in the plurality of bit lines.

A plurality of sub-block string select lines SSL0 to SSLn are operatively coupled to the string select gates of respective distinct subsets of NAND strings, where each subset of NAND strings includes a sub-block of the block of memory cells, to apply gate voltages to the sub-block string select gates.

Also, each of the NAND strings includes a corresponding lower select gate configured to connect the NAND string to the common source line or one of the one or more reference lines used to implement the common source line. A lower select gate layer GSL is coupled to all the lower select gates for the NAND strings in the block in this example. In another example, there can be a plurality of lower select gate lines arranged for connection to the lower select gates in the block.

In this example, a lower dummy word line DWLG lies between the lower select gate layer GSL and the lowest word line layer WL0, and an upper dummy word layer DWLS lies between the string select lines SSL0 to SSLn and the uppermost word line layer WLn+k.

In the circuit of FIG. 2, in order to select a particular memory cell in the block, a sub-block is activated by a sub-block string select line which connects each NAND string in the selected sub-block to a respective bit line in the plurality of bit lines, and a word line layer is selected which selects one memory cell at the level of the selected word line on each NAND string in the selected sub-block. The selected memory cell is activated by selecting one bit line corresponding to the NAND string in which the selected memory cell is located. This arrangement enables activation of a plurality of memory cells in parallel, one in each of the NAND strings of the selected sub-block, via its corresponding bit line and word line layer.

"Activate", as used herein, means to apply a particular bias so as to give effect to the connected cells or switches. The bias may be high or low, depending on the operation and the memory design. For the purposes of this description, the term "charging" refers to both driving the node to a higher voltage and driving the node to a lower voltage, including ground and negative voltages in some embodiments.

A NAND block as described herein can be implemented using a 3D NAND memory technology. Implementations can also be made using 2D NAND technology, in which the NAND block is logically defined across the plurality of 2D NAND arrays.

Figure 3:
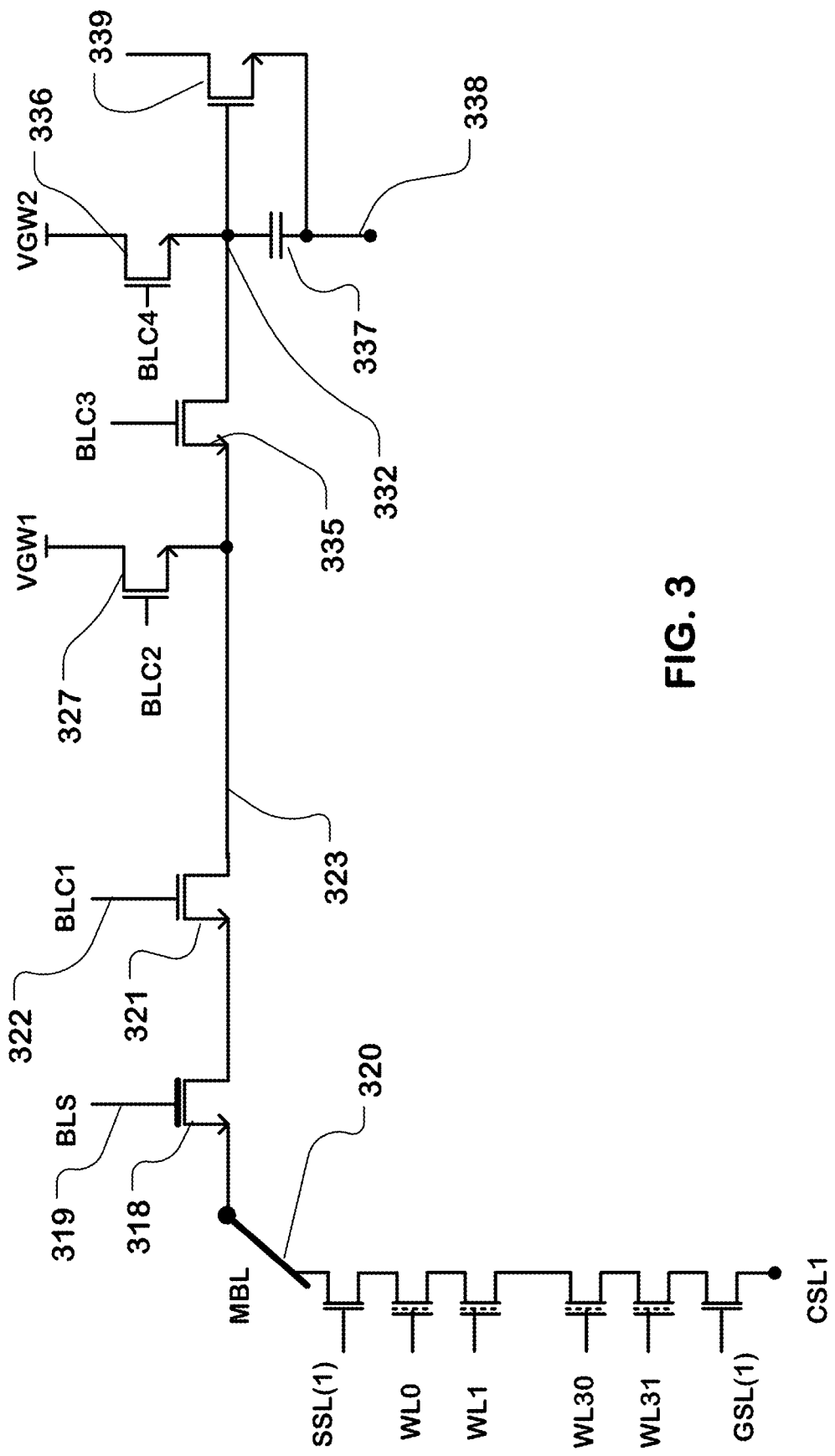
FIG. 3 is a simplified schematic diagram of a sense amplifier and bit line bias circuit usable in a device as described herein.

FIG. 3 illustrates the structure of a sense amplifier and bit line bias circuit which can be used to apply bias voltages to each bit line in the plurality of bit lines. A page buffer can include one sense amplifier and bit line bias circuit each bit line coupled to a selected block of the array.

The circuit in FIG. 3 is connected to a global bit line 320. A bit line select transistor 318 has a first source/drain terminal connected to the global bit line 320 and a second source/drain terminal. A gate of the bit line select transistor 318 is connected to a control signal BLS on line 319. A bit line clamp transistor 321 has a first source/drain terminal connected to the second source/drain terminal of transistor 318, and a second source/drain terminal connected to connecting node 323. The bit line clamp transistor 321 has its gate connected to the BLC1 line 322 at which bias voltages are applied by circuits not shown to control the voltage level of the MBL during precharge operations and other operations. A transistor 327 is provided for connecting node 323 to BLC2 line at which bias voltages are applied by circuits not shown. A pass transistor 335 is connected between connecting node 323 and a sensing node 332.

The pass transistor 335 is controlled by a control signal BLC3, which controls connection and disconnection of the connecting node 323 to the sensing node 332. A transistor 336 is connected between the sensing node 332 and a bias voltage VGW2, and is controlled by signal BLC4. A capacitor 337 (capacitance) is coupled from sensing node 332 to a sense signal node 338. A sensing transistor 339 has a gate connected to the sensing node 332, a first current carrying terminal connected to the sense pulse node 338 and a second current carrying terminal providing a sense amplifier output, which can be connected to latches of a page buffer.

During read operations and other operations, the transistors 318, 327 and 321 can be operated to set a bias voltage level on the selected bit lines as suits a particular operation.

Figure 4:
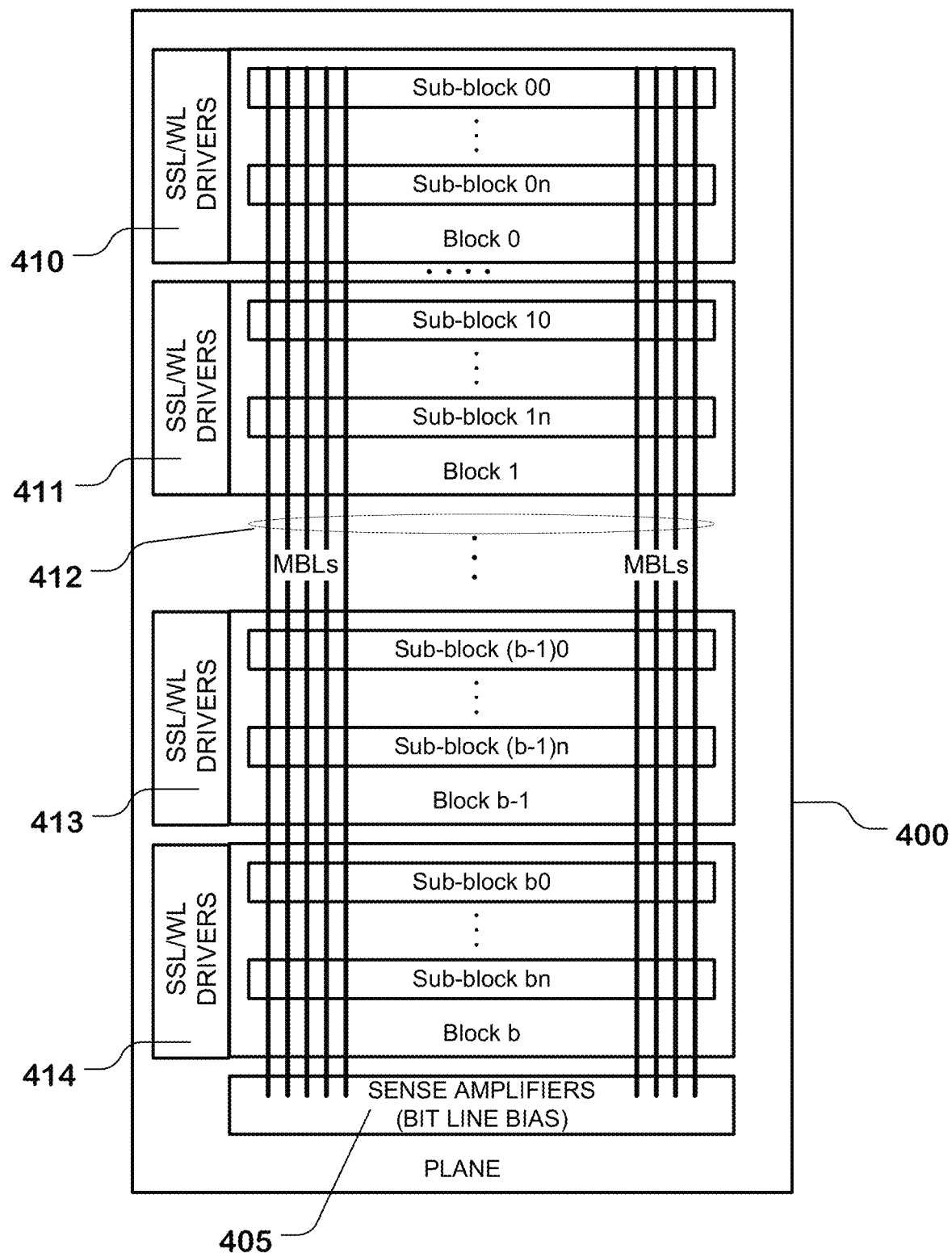
FIG. 4 is a block diagram of a segmentation of a memory plane according to embodiments described herein.
Figure 5:
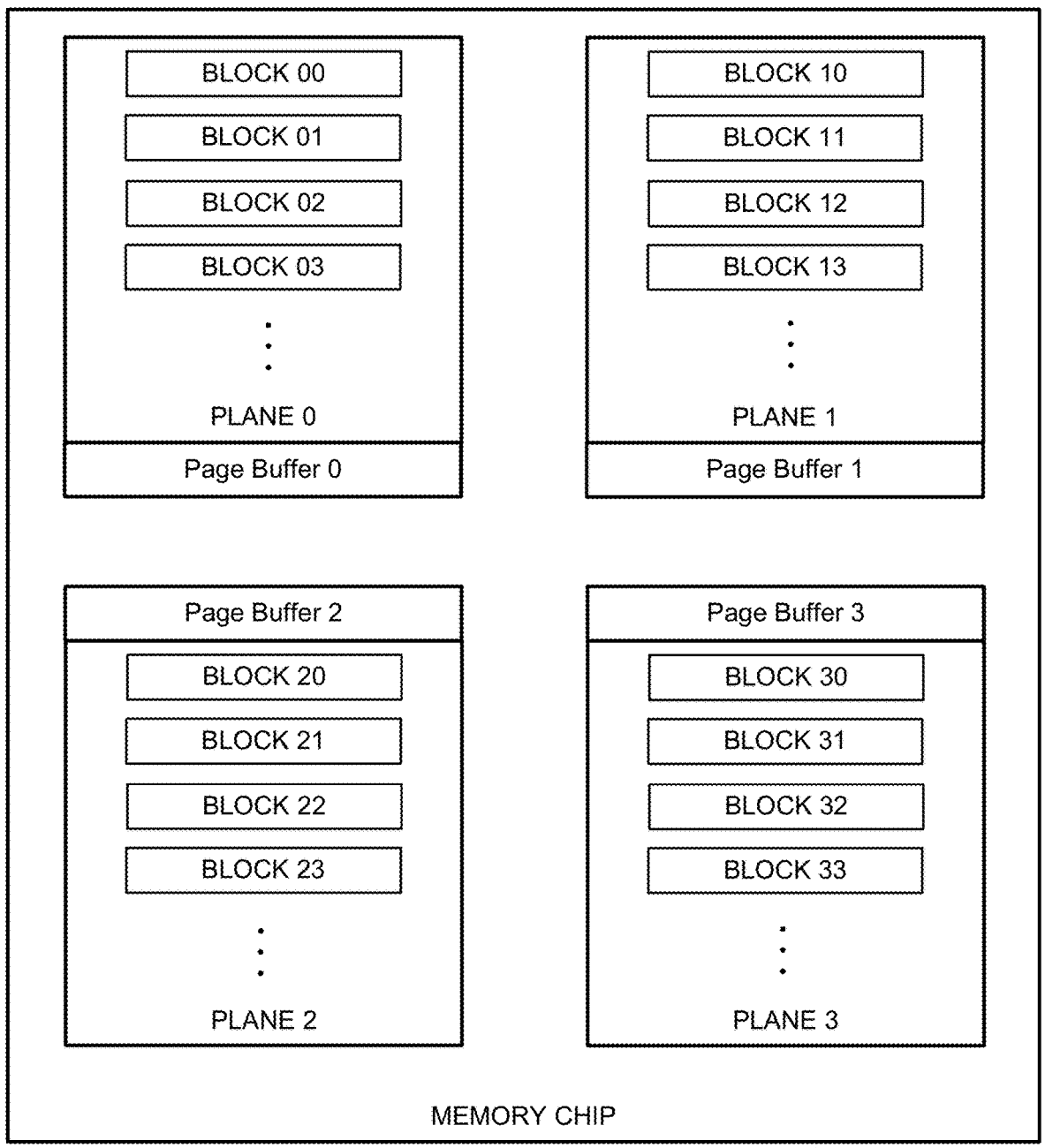
FIG. 5 is a block diagram of a segmentation of a memory array including multiple planes, according to embodiments described herein.

FIGS. 4 and 5 illustrate segmentation of a memory array on a memory device on a plane, block and sub-block levels according to one example to which the technology described herein can be applied. The technology described includes applying read setup operations that comprise applying bias voltages simultaneously to a plurality of memory cells to condition the plurality of memory cells for a subsequent read operation and also to prevent voltage threshold deviation of the memory cells. The conditioning can condition the memory cell so that the threshold voltages match or are close to the threshold voltages established during a program operation as mentioned above.

FIG. 4 illustrates a configuration of a single plane 400 in a memory array. The plane 400 includes a plurality of blocks, Block 0, Block 1, . . . Block (b−1) and Block(b). Each of the blocks includes a plurality of sub-blocks. Thus, block 0 includes sub-block 00 to sub-block 0n, block 1 includes sub-block 10 to sub-block 1n, Block (b−1) includes sub-block (b−1)0 two sub-block (b−1)n and Block b includes sub-block (b)0 two sub-block (b)n.

A plurality of global bit lines 412 (MBLs) superimposes, and is shared by, all of the blocks in the plane. A set of sense amplifiers and bit line bias circuits 405 (e.g., FIG. 3) which can be part of page buffer circuits, is coupled to the plurality of global bit lines 412, by which bias voltages can be applied to the global bit lines 412 in support of the read setup operations. The set of sense amplifiers and bit line bias circuits 405 is shared by all of the blocks in the plane. Each of the blocks includes corresponding string select line SSL and word line WL drivers 410, 411, 413, 414, by which bias voltages can be applied in support of the read setup operations. Also, a common source line driver can be applied to each of the blocks.

A read setup operation can be applied to only one block at a time in a given plane in some embodiments. In other embodiments, a read setup operation can be applied to multiple blocks simultaneously in a given plane. In other embodiments, the read setup operation for a block having a number "n" of sub-blocks, can be applied more than one and fewer than "n" sub-blocks simultaneously. In other embodiments, the read setup operation can be applied to one or more sub-blocks in one block and one or more sub-blocks in another block of the plane simultaneously. In another embodiment, the read setup operation can be applied to one or more pages (e.g., on a page-by-page basis) of particular blocks that have been identified. This can be referred to as performing a read setup operation to a portion of a block.

FIG. 5 illustrates a memory 500 including multiple planes, Plane 0, Plane 1, Plane 2 and Plane 3 in this example. Each of the planes includes distinct page buffer circuits, including Page Buffer 0, Page Buffer 1, Page Buffer 2, Page Buffer 3. The Page Buffers are coupled to input/output circuitry not shown, supporting high throughput memory operations on the multiple planes. As illustrated, each of the planes includes a plurality of blocks. Plane 0 includes Block 00, Block 01, Block 02, Block 03, . . . . Plane 1 includes Block 10, Block 11, Block 12, Block 13, . . . . Plane 2 includes Block 20, Block 21, Block 22, Block 23, . . . . Plane 3 includes Block 30, Block 31, Block 32, Block 33, . . .

A read setup operation can be applied to one block or multiple blocks in a single plane as discussed with reference to FIG. 5 to prevent voltage threshold deviation of the memory cells so that the threshold voltages match or are close to the threshold voltages established during a program operation as mentioned above. Also, a read setup operation can be applied to one block or multiple blocks in one plane, and one block or multiple blocks in another plane simultaneously in some embodiments. Also, a read setup operation can be applied to one or more sub-blocks in one block of one plane, and one or more sub-blocks in one block of another plane simultaneously. Also, read setup operations can be applied to other read setup units, other than sub-block, block and plane units as suits a particular memory configuration.

FIGS. 6-13 are examples and flow charts of operations that can be utilized to perform read setup procedures as described herein, that apply bias arrangements in parallel or simultaneously to a plurality of memory cells, such as to multiple memory cells coupled to a single bit line, to all the memory cells in a sub-block, to all the memory cells in a block, to all the memory cells in multiple sub-blocks, or to all the memory cells in multiple blocks.

Furthermore, FIGS. 6-13 are examples and flow charts illustrating logic executed by a memory controller (e.g., a host) or by a memory device. The memory controller (e.g., host) and the memory device can be separate components or all integrated together as a memory device. The logic can be implemented using processors programmed using computer programs stored in memory accessible to the computer systems and executable by the processors, by dedicated logic hardware, including field programmable integrated circuits, and by combinations of dedicated logic hardware and computer programs. With all flow charts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology disclosed, and it will be understood that numerous additional steps for accomplishing other functions can be performed before, after and between those shown.

Figure 6:
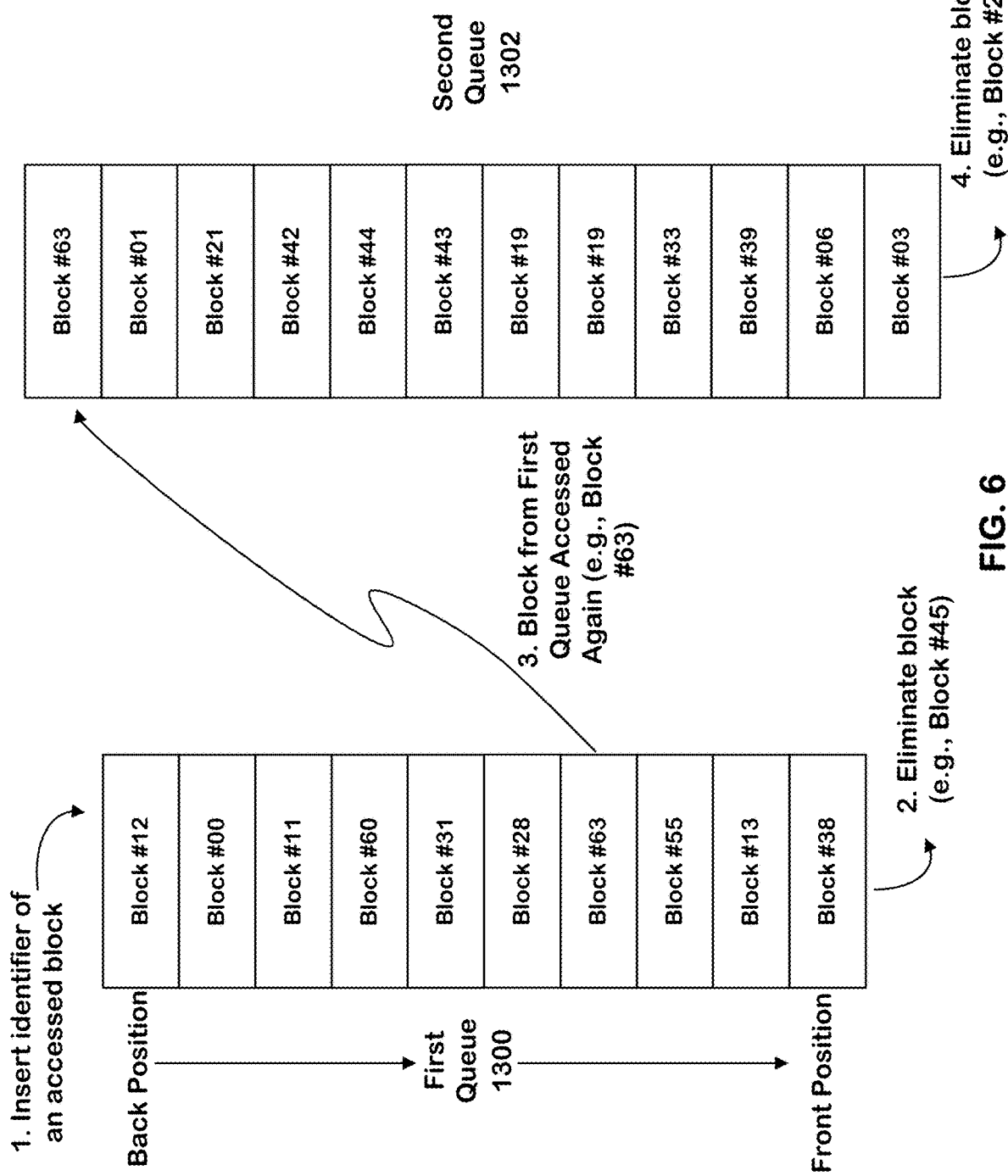
FIG. 6 illustrates the use of first and second queues for identifying read setup candidate blocks of a flash memory, according to an embodiment of the technology disclosed.

FIG. 6 illustrates the use of first and second queues for identifying read setup candidate blocks of a 3D flash memory, according to an embodiment of the technology disclosed.

Specifically, FIG. 6 illustrates a first queue 1300, which can be a first-in first-out (FIFO) queue 1300 and a second queue 1302, which can be a least recently used (LRU) queue 1302. The first and second queues 1300, 1302 can be other types of queues, such as a circular queue, a priority queue or a double-ended queue. The first and second queues 1300, 1302 can be implemented using a linked list using linked list pointers to point to positions in the linked list.

As illustrated, the first and second queues 1300, 1302 include a plurality of positions, including a front (frontmost) position, middle positions, and a back (backmost) position.

FIG. 6 illustrates the second queue 1302 having more positions than the first queue 1300 (e.g., the second queue 1302 is of a bigger "size" than the first queue 1300). This is only an example. The first queue 1300 can have the same number of positions as the second queue 1302 (e.g., the first and second queues 1300, 1302 can be the same "size") or it can have more positions than the second queue 1302 (e.g., the first queue 1300 can be of a bigger "size" than the second queue 1302).

The positions in the first queue 1300 are used to identify blocks of the flash memory that have been accessed (e.g. read operation). As new blocks of the flash memory are accessed, their identifiers (e.g., block #12) are added the back position of the first queue 1300 (see item 1 of FIG. 6). In order to make room for the new identifier, the other identifiers are shifted towards the front of the first queue 1300. In this example, the identifier of block #12 is newly added to the back position of the first queue 1300 as a result of block #12 being accessed, causing the other identifiers to be shifted towards the front of the first queue 1300. If the positions in the first queue 1300 are full, then an identifier of a block of memory will be eliminated as a result of the shift (e.g., the identifier of block #45 is eliminated from the first queue 1300; see item 2 of FIG. 6). As an alternative to the example described above, the first queue 1300 can be implemented as a linked list and linked list pointers can be updated to achieve the same result.

Before an identifier of a block of flash memory is added to the first queue 1300, the technology disclosed checks to see if there is an identifier of the block of flash memory already included in the first queue 1300 or the second queue 1302. If there is not an identifier of the particular block of flash memory included in the first queue 1300 and there is not an identifier of the particular block of flash memory included in the second queue 1302, then the identifier of the particular block (e.g., block #12) can be added to the backmost position of the first queue 1300.

If a particular block of flash memory that is accessed is already identified in the first queue 1300 (e.g., block #63) (and not already identified in the second queue 1302), then an identifier of the particular block (e.g., block #63) is added to a backmost position of the second queue 1302 (see item 3 of FIG. 6). As discussed above regarding the first queue 1300, in order to make room for the identifier to be newly added to the second queue 1302, identifiers of other blocks included in the second queue 1302 are shifted towards the front of the second queue 1302. If the positions in the second queue 1302 are full, then an identifier of a block of memory will be eliminated as a result of the shift (see item 4 of FIG. 6). For example, as illustrated in FIG. 6, block #27 is eliminated from the second queue 1302 as a result of the shifting and adding of the identifier of block #63. The identifier of the accessed block that was newly added to the second queue 1302 can be removed from the first queue 1300. For example, as illustrated in FIG. 6, the identifier of block #63 can be removed from the first queue 1300 making space for a new identifier of a block and also preventing a block from being identified more than once in the first and second queues 1300, 1302. In this example, blocks #12, #00, #11, #60, #31 and #28 can be shifted towards the front of the first queue 1300 as a result of block #63 being removed. As an alternative to the example described above, the first and/or second queues 1300, 1302 can be implemented as a linked list and linked list pointers can be updated to achieve the same result.

Figure 7:
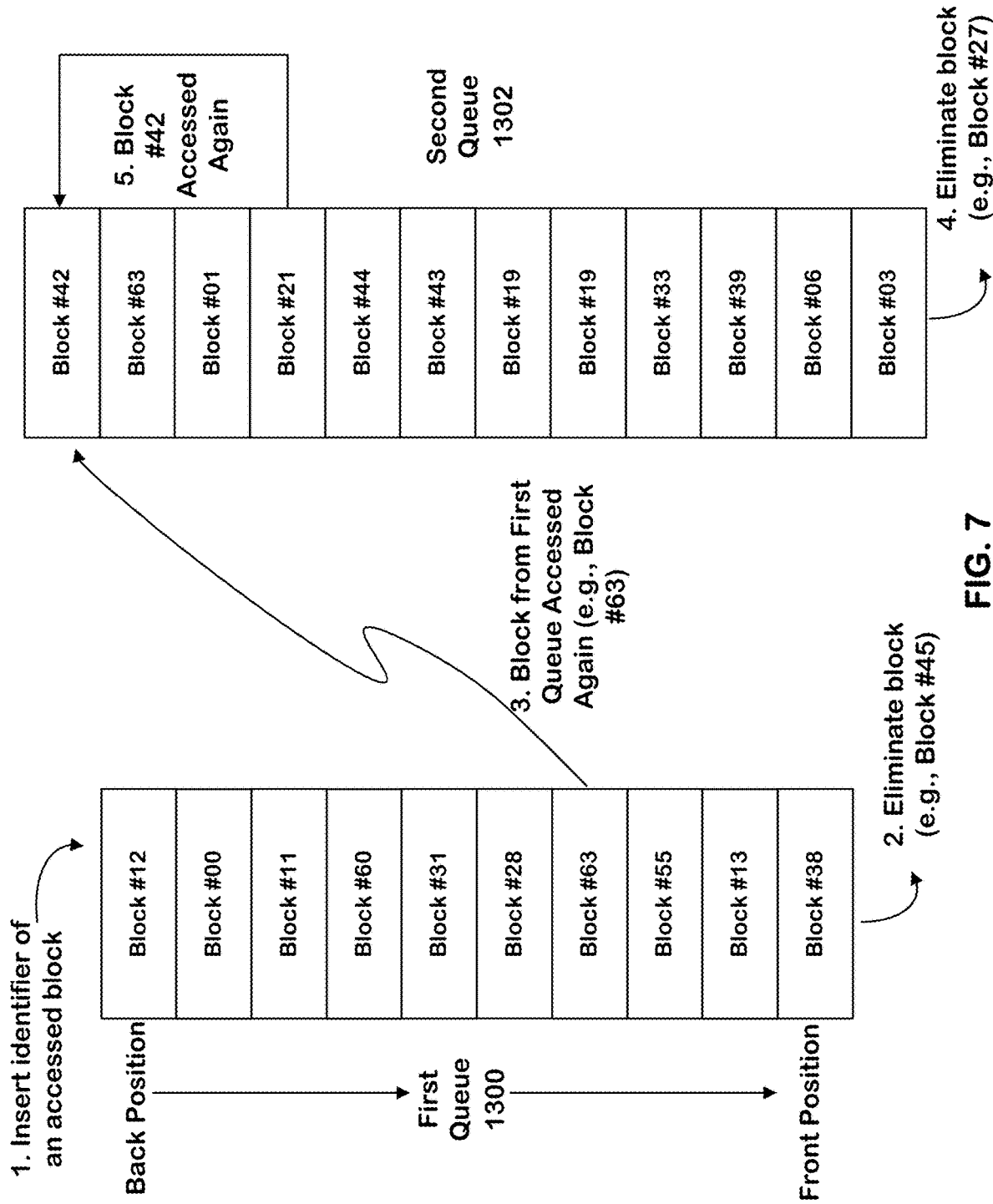
FIG. 7 illustrates the use of first and second queues for identifying read setup candidate blocks of a flash memory, according to an embodiment of the technology disclosed.

FIG. 7 illustrates the use of first and second queues for identifying read setup candidate blocks of a flash memory, according to an embodiment of the technology disclosed.

FIG. 7 is similar to FIG. 6, except that it provides an example of an identifier of an accessed block of flash memory not being included in the first queue 1300, but already being included in the second queue 1302. As a result, the identifier included in the second queue 1302 can be moved to a backmost position of the second queue 1302 if it is not already located at the backmost position (see item 5 of FIG. 7). For example, as illustrated in FIG. 7, if block #42 is accessed and it is not identified in the first queue 1300, but it is identified in a non-backmost position the second queue 1302, then the identifier of block #42 is moved to the backmost position of the second queue 1302. In this example, the identifiers of blocks #63, #01 and #21 will be shifted towards the front of the second queue 1302 as a result of the identifier of block #42 being moved to the back of the second queue 1302. As an alternative to the example described above, the first and/or second queues 1300, 1302 can be implemented as a linked list and linked list pointers can be updated to achieve the same result.

Figure 8:
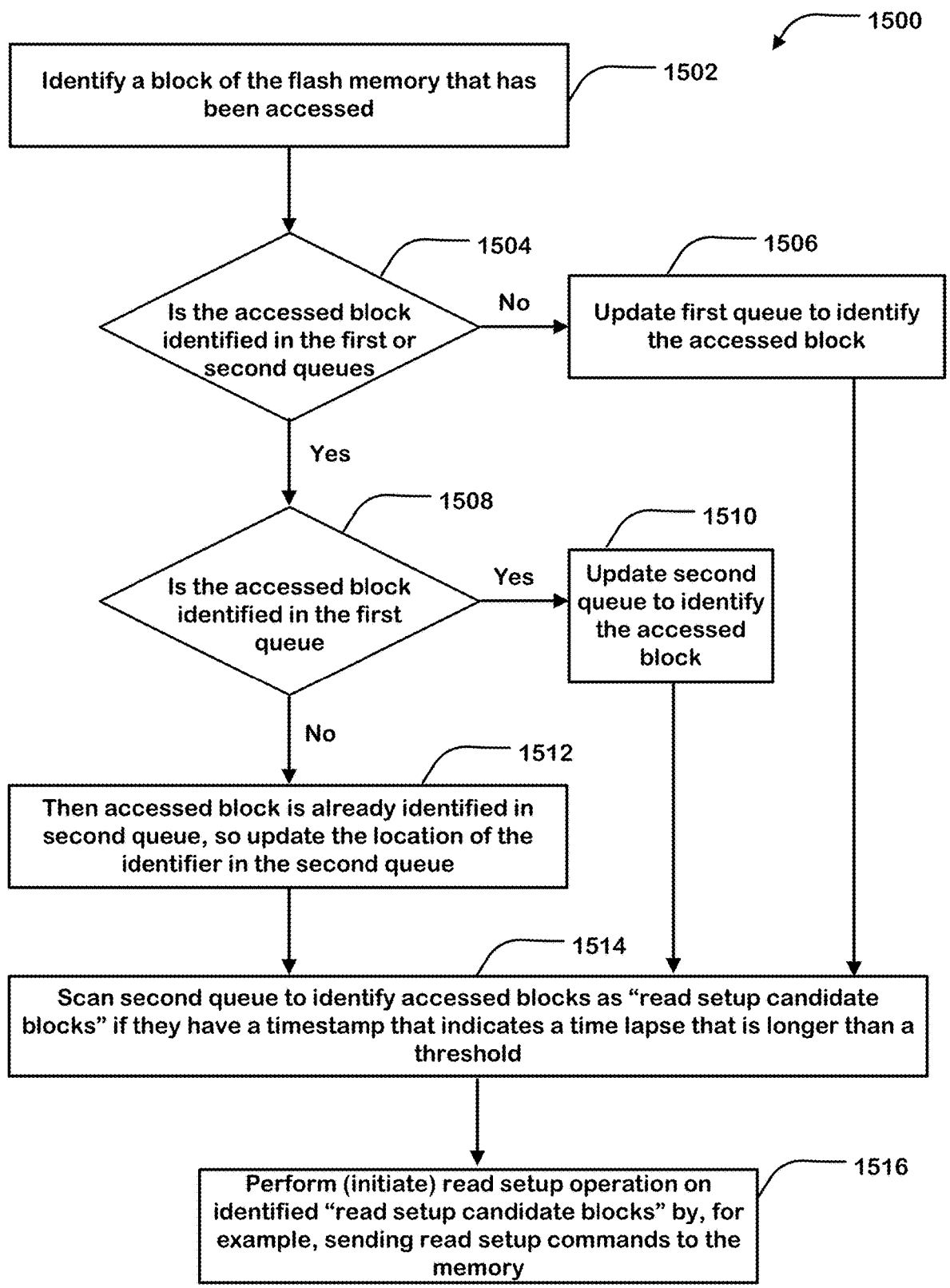
FIG. 8 illustrates a flow chart describing identifying read candidate blocks of a flash memory and performing a read setup operations on the identified read candidate blocks, according to an embodiment of the technology disclosed.

FIG. 8 illustrates a flow chart describing identifying read candidate blocks of a flash memory and performing read setup operations on the identified read candidate blocks, according to an embodiment of the technology disclosed.

Specifically, FIG. 8 is a flow chart 1500 for a representative method of operating a NAND flash memory including a plurality of blocks of memory cells arranged in NAND strings, each block including a distinct set of NAND strings. As described above, each block can include a plurality of sub-blocks, each sub-block including a distinct subset of NAND strings.

In FIG. 8, operation 1502 identifies a block of flash memory that is accessed. In response to the access (e.g., the identification of the access) of the block of memory, operation 1504 determines whether the accessed block of memory is identified in the first queue 1300 or the second queue 1302. If the accessed block of memory is not identified the first or second queues 1300, 1302, then operation 1506 updates the first queue 1300 to identify the accessed block, as discussed above with reference to FIGS. 6 and 7.

If the accessed block of memory is identified in either of the first or second queues 1300, 1302 (yes, in operation 1504), then operation 1508 determines whether the accessed block of flash memory is specifically identified in the first queue 1300. If the accessed block is determined to be identified in the first queue 1300 (yes, in operation 1508), then operation 1510 updates the second queue 1302 to identify the accessed block. As discussed with reference to FIGS. 6 and 7, the identifier of the accessed block can be removed from the first queue 1300, as it has been added to the second queue 1302. Furthermore, as discussed above, when identifiers are added to the queues in operations 1506 and 1510, the existing identifiers in the queues can be shifted towards the front of the queues.

If it is determined at operation 1508 that the accessed block is not identified in the first queue 1300, then operation 1512 determines that the accessed block should be included in the second queue 1302 and then updates the location (position) of the identifier of the accessed block in the second queue 1302, as discussed above with reference to FIGS. 6 and 7 (e.g., the position of the identifier is moved to the back of the second queue 1302 and other identifiers can be shifted towards the front of the second queue 1302).

Next, operation 1514 scans the second queue 1302 to identify any accessed blocks that qualify as read setup candidate blocks. A block can be identified as a read setup candidate block if it has been identified as being present in the second queue 1302 longer than (or equal to) a predetermined threshold. A determination of whether a block has been present in the second queue 1302 longer than (or equal to) the predetermined threshold can be made using a timestamp or a time counter associated with the block in the second queue 1302. If the timestamp or time counter indicates that there has been a time lapse that is longer than (or equal to) the predetermined threshold, then the block has been present in the second queue 1302 longer than (or equal to) the predetermined threshold. The predetermined threshold for identifying read setup candidate blocks can be set to reflect any amount of time. In an example, the predetermined threshold can be set to 9 minutes, such that if the accessed block has been identified in the second queue 1302 for more than 9 minutes, then the accessed block will be identified as a read setup candidate block. The timestamp or time counter of the identified and accessed block can be set to zero when the block is first identified in the second queue 1302 or when it is moved to a backmost position in the second queue 1302 (as discussed below, the timestamp or time counter can be updated each time a scanning procedure is performed). The timestamp or time counter can be set relative to a time at which a block has been assessed and/or identified on the first and/or second queues 1300, 1302. For example, the timestamp or time counter of the identified and accessed block can be set to reflect a time (e.g., system clock time) at which the accessed block is identified in the first queue 1300 or it can be set to reflect a time (e.g., system clock time) at which the accessed block is initially identified in the second queue 1302 (e.g., when the identifier of the accessed block is moved from the first queue 1300 to the second queue 1302). The timestamp or time counter of the accessed block can also be set to reflect a time at which the location (position) of the identifier of the accessed block is moved to the back of the second queue 1302, as discussed above with reference to operation 1512. Other techniques for setting and/or changing the timestamp or time counter, such as those described below with reference to FIGS. 10 and 11, can be implemented. As an alternative to moving the positions of the identifiers of the blocks in the first and/or second queues 1300, 1302 and as an alternative to updating linked list pointers as discussed above, the timestamps or time counters can be updated in first and/or second queues 1300, 1302 in response use of or access to the particular blocks.

Once the read setup candidate blocks have been identified, operation 1516 performs a read setup operation on the read setup candidate blocks. The read setup operation can be performed according to any of the techniques described herein. In an embodiment, the read setup operation may not be performed on all of the read setup candidate blocks, as other qualifications for performing the read setup operation on blocks may be considered. In an embodiment, the read setup operation is performed only on a portion of block, such as a particular page of the block. The page of the block can be identified using the same techniques described above or the page of the block can be identified in the identifier of the block itself as the block is identified in the first and second queues 1300 and 1302. Accordingly, the read setup operations can be performed on a page-by-page basis. Therefore, a read setup operation being performed on an identified block can include performing the read setup operation on a page of the block, on multiple pages of the block or on all pages of the block. These techniques for performing the read operation on a portion of a block (e.g., a page of a block) can be implemented by all other read setup operation techniques described herein.

Figure 9:
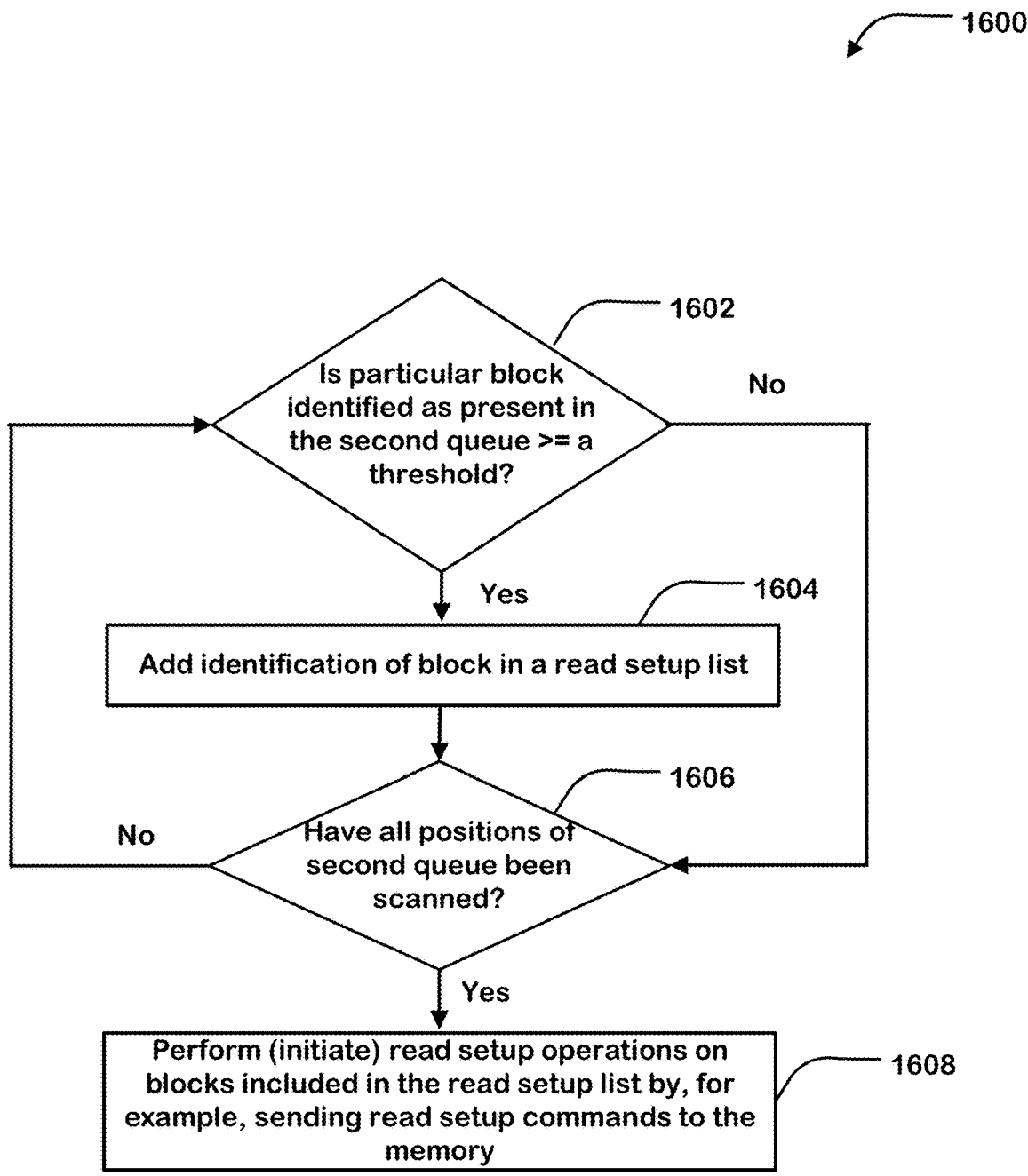
FIG. 9 illustrates a flow chart describing scanning a second queue to identify read setup candidate blocks of a flash memory and performing read setup operations on the identified read setup candidate blocks, according to an embodiment of the technology disclosed.

FIG. 9 illustrates a flow chart describing scanning a second queue to identify read setup candidate blocks of a flash memory and performing read setup operations on the identified read setup candidate blocks, according to an embodiment of the technology disclosed.

Specifically, FIG. 9 illustrates a flow chart 1600 that describes the scanning operation 1514 of FIG. 8 in more detail. The second queue 1302 can be periodically scanned according to a predetermined time interval. The predetermined time interval can be set to any time. An example time interval can be 1 minute. The second queue 1302 can be scanned starting from the frontmost position and ending at the backmost position, or in any other order. Each time a scan is performed, every position in the second queue 1302 can be scanned.

At operation 1602, during the scanning a determination is made as to whether a time lapse of a particular block identified in the second queue 1302 is greater than (or equal to) the predetermined threshold (e.g., has a particular block been identified as being present in the second queue 1302 longer than a predetermined threshold). If the time lapse for that particular block is greater than (or equal to) the predetermined threshold, then operation 1604 can add an identifier of the particular block to a read setup list in operation 1604. Next, operation 1606 determines whether all positions of the second queue 1302 have been scanned. If they have not been scanned (no, at operation 1606), then operation 1602 checks the time lapse of another block identified in the second queue 1302.

If, on the other hand, operation 1602 determines that the time laps does not exceed (or equal) the predetermined threshold, then the identifier of the particular block is not added to the read setup list and operation 1606 checks to see if all positions of the second queue 1302 have been scanned. As illustrated, once all positions of the second queue 1302 have been scanned (i.e., yes in operation 1606), then operation 1608 performs the read setup operations on the blocks of the memory that are included in the read setup list by, for example, sending read setup commands to the memory. Further, for example, operation 1608 can send read setup commands from a host (e.g., a memory controller) to the memory 2108, such that the read setup commands are received by command decoder/control circuits 2134 of the memory 2108, then scheduled by a state machine of the memory 2108 and then executed on the memory 2108. After the read setup operations have been initiated and/or completed the read setup list can be cleared, so that it can be repopulated the next time the second queue 1302 is scanned (e.g., once the predetermined time increment has expired and it is time for the scanning operations to begin again).

Figure 10:
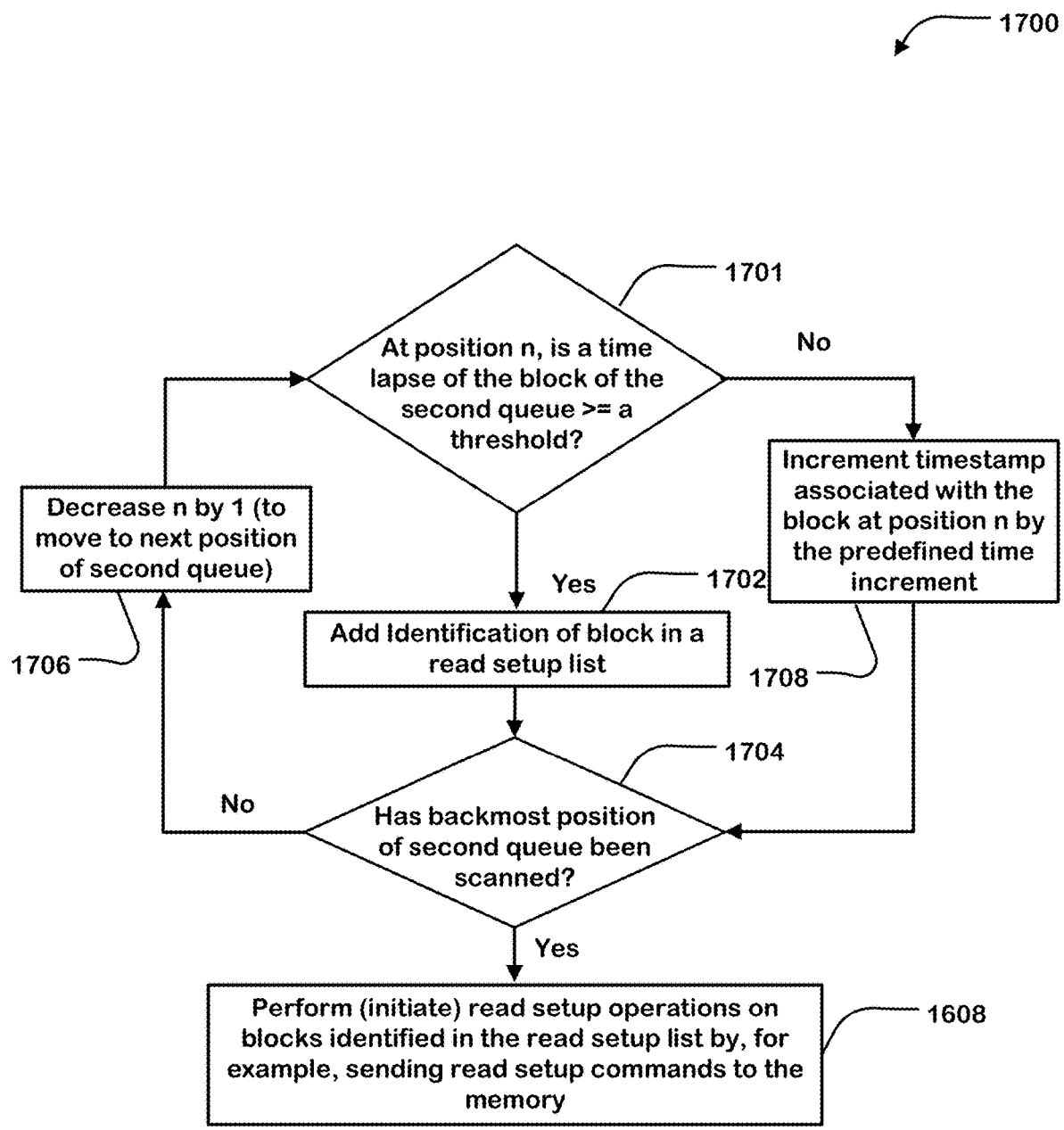
FIG. 10 illustrates a flow chart describing scanning a second queue to identify read setup candidate blocks of a flash memory and performing read setup operations on the identified read setup candidate blocks, according to an embodiment of the technology disclosed.

FIG. 10 illustrates a flow chart describing scanning a second queue to identify read setup candidate blocks of a flash memory and performing read setup operations on the identified read setup candidate blocks, according to an embodiment of the technology disclosed.

Specifically, FIG. 10 illustrates a flow chart 1700 that is similar to the flow chart 1600 of FIG. 9, except that further detail is provided regarding the order of the scanning and the incrementing of the timestamps.

At operation 1701, the scanning starts at position n of the second queue 1302. As discussed above, the scanning can start at a frontmost position, a backmost position or any other position of the second queue 1302. In this example, the scanning at operation 1701 will begin at the frontmost position of the second queue 1302, where n represents the number of positions in the second queue 1302. For example, if the second queue 1302 includes 12 positions for identifying different blocks of the memory, then n could initially equal 11 in operation 1701. This could be done in the reverse order, where n could start at 0 and increment up to 11 if there are 12 positions in the second queue 1302.

At operation 1701, a determination is made as to whether the time lapse for the block identified at position n (e.g., position 12, where n equals 11) is greater than (or equal to) the predetermined threshold.

In an embodiment, if the time lapse is not greater (or equal to) the predetermined threshold, then operation 1708 can increment the timestamp or time counter associated with the identifier of the block. In this particular embodiment, the timestamp or time counter associated with the block would initially be set to, for example 0 when the identifier of the block is added to the second queue 1302. Then, when the operation 1708 is performed, the timestamp or time counter will be incremented by the same time that the scanning is set to repeat. For example, if the scanning is set to repeat every 1 minute, then each time the scanning is performed and the identified block is still below the predetermined threshold, the timestamp or time counter will be incremented by 1 minute. Eventually, the timestamp or time counter associated with that particular block will be sufficiently incremented so that it equals or is greater than the predetermined threshold.

In another embodiment, operation 1708 can be omitted when the timestamp or time counter associated with the particular block is based on the system clock time at which the identifier of the particular block was added to, for example, the second queue 1302 (or the time at which the identifier was added to the first queue 1300 or the time at which the identifier was moved to the front of the second queue 1302 from another position in the second queue 1302). In this embodiment, there is no need for operation 1708, because the timestamp or time counter associated with the identifier of the particular block can be compared to the current system clock time to determine whether or not sufficient time has passed to meet or exceed the predetermined threshold. In this embodiment, operation 1708 is omitted, such that if operation 1701 results in "no," then operation 1704 is performed to determine whether or not the backmost position of the second queue 1302 has been scanned. In an embodiment, the second queue 1302 is scanned starting from the frontmost position and ending with the backmost position, as described above. Therefore, if the backmost position has been scanned, then all of the positions will have been scanned. In another embodiment where, perhaps, the scanning starts at the backmost position heading towards the frontmost position, operation 1704 will determine whether the frontmost position has been scanned. Furthermore, in another embodiment, operation 1704 can simply determine whether or not all of the positions in the second queue 1302 have been scanned.

Moving back to the description of operation 1701, if the time lapse is greater than (or equal to) the predetermined threshold, then operation 1702 will add the identifier of the particular block that is in position n of the second queue 1302 to a read setup list. Once the identifier is added to the read setup list, operation 1704 determines whether the backmost position of the second queue 1302 has been scanned (i.e., whether all of the positions have been scanned).

If the backmost position has not yet been scanned, the value of n is decremented by one in operation 1706 so that operation 1701 can be performed on the next block in the second queue 1302. Note that in another embodiment, operation 1706 could increment the value of n, in a situation where, for example, n starts with a value of 0. This cycle will continue until all of the positions have been scanned.

Once all of the positions have been scanned (i.e., yes in operation 1704), operation 1608 performs read setup operations on blocks that are identified in the read setup list. After the read setup operations are performed, the read setup list can be cleared out so that the next time the scanning is performed at the predetermined time the read setup list will be empty.

Figure 11:
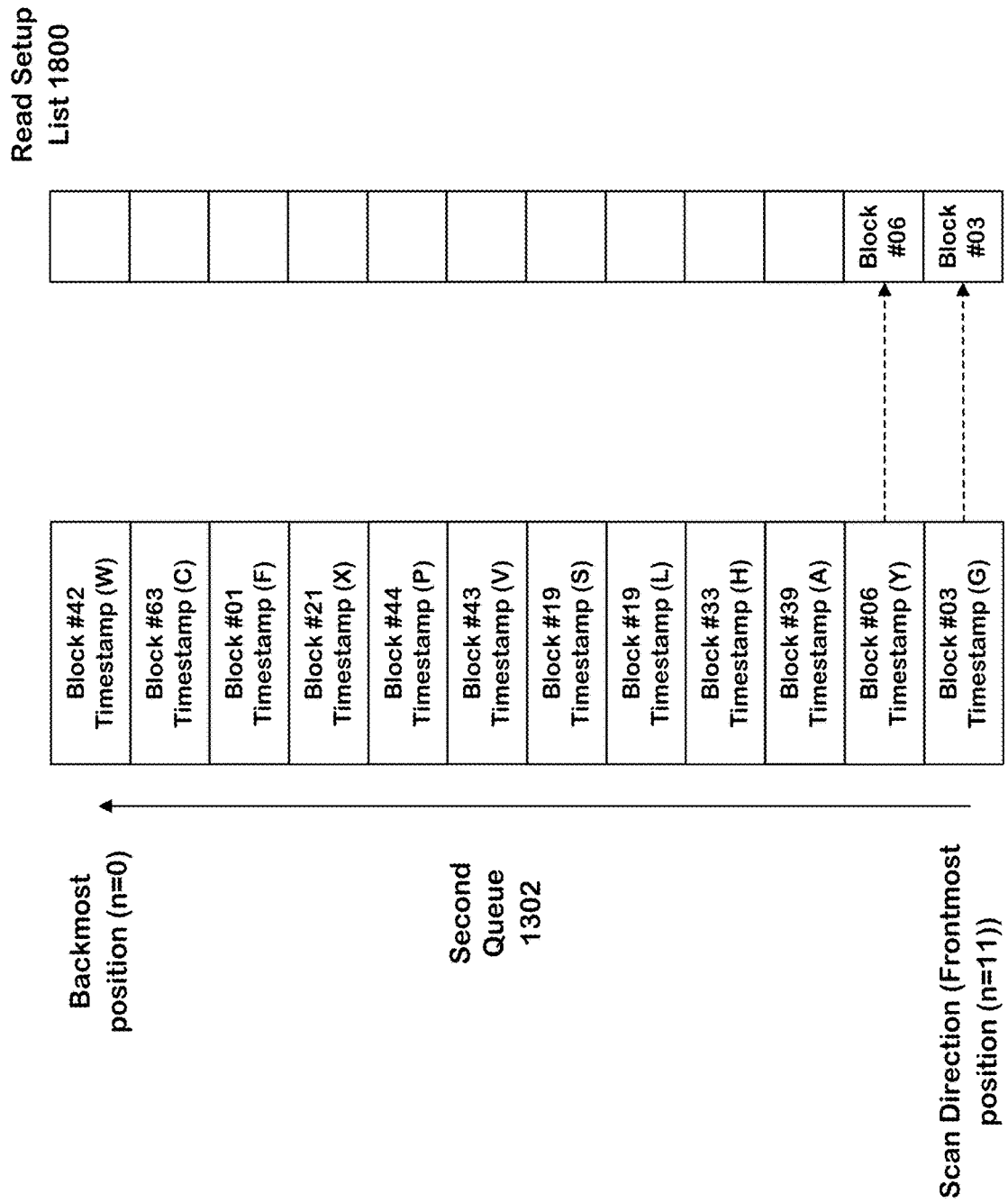
FIG. 11 illustrates the use of a read setup list for performing read setup operations, according to an embodiment of the technology disclosed.

FIG. 11 illustrates the use of a read setup list for performing read setup operations, according to an embodiment of the technology disclosed.

Specifically, FIG. 11 illustrates how a read setup list 1800 is populated from the second queue 1302. As illustrated, the second queue 1302 includes, for example, 12 positions at which various blocks are identified. As discussed above with reference to FIG. 10, the scanning of the second queue 1302 can begin at the frontmost position (e.g., n=11) and end at the backmost position (n=0), such that each time n is decremented the next position closer to the backmost position of the second queue 1302 is scanned. Once the scanning reaches the backmost position, that particular scanning operation is complete and scanning will resume again at the predetermined time increment (e.g., 1 minute).

Furthermore, as illustrated in FIG. 11, each position of the second queue 1302 includes an identifier of a particular block (e.g., block #06) and a corresponding timestamp or time counter (e.g., timestamp (Y)). As discussed above, the timestamps can be utilized in different ways. For example, the timestamp can start at 0 and each time the scanning is performed, the timestamp or time counter can be incremented by some value (e.g., by the predetermined time increment according to which the scanning is performed). Alternatively, the timestamp or time counter can be the time of the system clock at which the identifier of the particular block was added the second queue 1302 or the first queue 1300. If this alternate approach is used, there is no need for operation 1708, as discussed above with reference to FIG. 10.

As the scanning is performed, if a particular timestamp or time counter (e.g., timestamp (Y)) associated with a particular block (e.g., block #06) is greater than (or equal to) the predetermined threshold, then an identifier of that particular block is added to the read setup list 1800. FIG. 11 illustrates two timestamps or time counters exceeding the predetermined threshold, such that identifiers of blocks #06 and #03 are added to the read setup list 1800.

The read setup list 1800 can be formed so as to have the same number of positions as the second queue 1302, such that there can be one-to-one mapping from the positions in the second queue 1302 to the positions in the read setup list 1800. Other types of read setup lists can be used that do not have a one-to-one mapping to the second queue 1302. Once the scanning iteration is complete, the read setup operations are performed on the blocks that are identified in the read setup list 1800. As mentioned above with respect to FIG. 10, the read setup list 1800 can be cleared out after the read setup operations have been performed, so that it is empty when the next scanning operation begins. The read setup operations can be started from the frontmost position or the backmost position of the read setup list 1800, or in any other order or at the same time.

Figure 12:
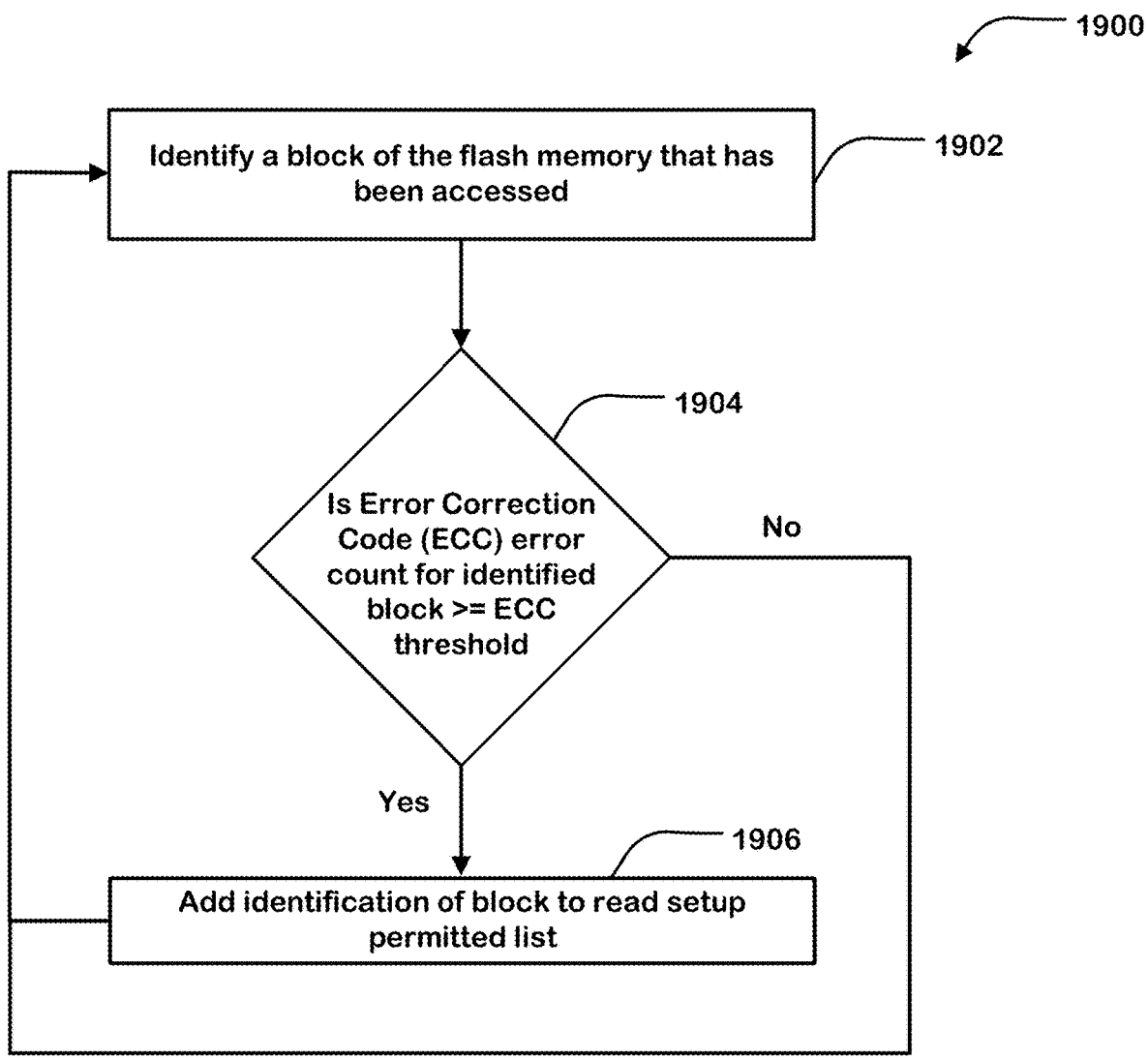
FIG. 12 illustrates a flow chart describing the use of an error correction code (ECC) for identifying read setup candidate blocks, according to an embodiment of the technology disclosed.

FIG. 12 illustrates a flow chart describing the use of an error correction code (ECC) for identifying read setup candidate blocks, according to an embodiment of the technology disclosed.

In the early lifetime of blocks of memory, there may not be a need to perform the read setup operations because the rate at which the threshold voltages deviate over time is not yet undesirable. Therefore, in an embodiment of the technology disclosed, the read setup operations will only be performed on blocks have been sufficiently used.

FIG. 12 illustrates a flow chart 1900 that describes the implementation of using an error correction code (ECC) to identify an ECC error count for determining whether particular blocks have been sufficiently used before implementing the various techniques for performing the read setup operations. Operation 1902 identifies a block of the flash memory that has been accessed. Operation 1904 determines, for the particular block, whether a number of errors has been detected, using the ECC, that is great than (or equal to) an ECC threshold. A persistent non-volatile list can be used to keep track of the number of errors detected for the blocks of the memory, such that the contents of the list remain after the loss of power. Each time an error occurs, an ECC error count for the particular block can be increased in the list. This list can be used when determining the number of errors for the block identified in operation 1902 is greater than (or equal to) the ECC threshold. Alternatively, the number of errors for a particular read operation can be tracked, such that if the number of errors detected using ECC exceeds the ECC threshold, then the particular block that is the subject of the read operation can be identified in a list.

If the number of errors (e.g., the ECC error count) is greater than (or equal to) the ECC threshold, then operation 1906 adds an identifier of the particular block to a read setup permitted list and then operation 1902 will be performed to identify another block. If the ECC error count is not greater than (or equal to) the ECC threshold (i.e., no at operation 1904) the identifier of the particular block is not added to the read setup permitted list and operation 1902 will be performed to identify another block. Further, if operation 1904 determines that the ECC error count is great than (or equal to) the ECC threshold for a particular block, then the block can be identified in the first or second queues 1300, 1302 or it can be identified in the read setup list (i.e., identified as a read setup candidate) regardless of whether the particular block of memory has been identified as present in the second queue 1302 longer than the predetermined threshold or regardless of whether the particular block of memory has been identified in any of the first and/or second queues 1300, 1302.

Using the ECC error count is only one way of determining whether a particular block of memory has been sufficiently used in order to be a read setup candidate. Other types of usage can be considered, such as the number of program and erase (PE) cycles of the particular block. Similar to what is describe above regarding the ECC error count, a list can be maintained the keeps track of the number of PE cycles for each block. If the number of PE cycles are greater than (or equal to) a particular PE threshold for a particular block, then an identifier of the block will be added to the read setup permitted list. Other techniques for determining whether a particular block of memory has been sufficiently used can also be implemented along with the ECC error count and/or the PE cycle count, or on their own.

In an embodiment of the technology disclosed, the read setup operations can be performed on blocks that are identified in the setup permitted list without using the techniques described above that use the first and second queues 1300, 1302. Or, as described below with reference to FIG. 13, the read setup permitted list can be integrated into the operations that utilize the first and second queues 1300, 1302 to determine which blocks are candidates for the read setup operations.

Figure 13:
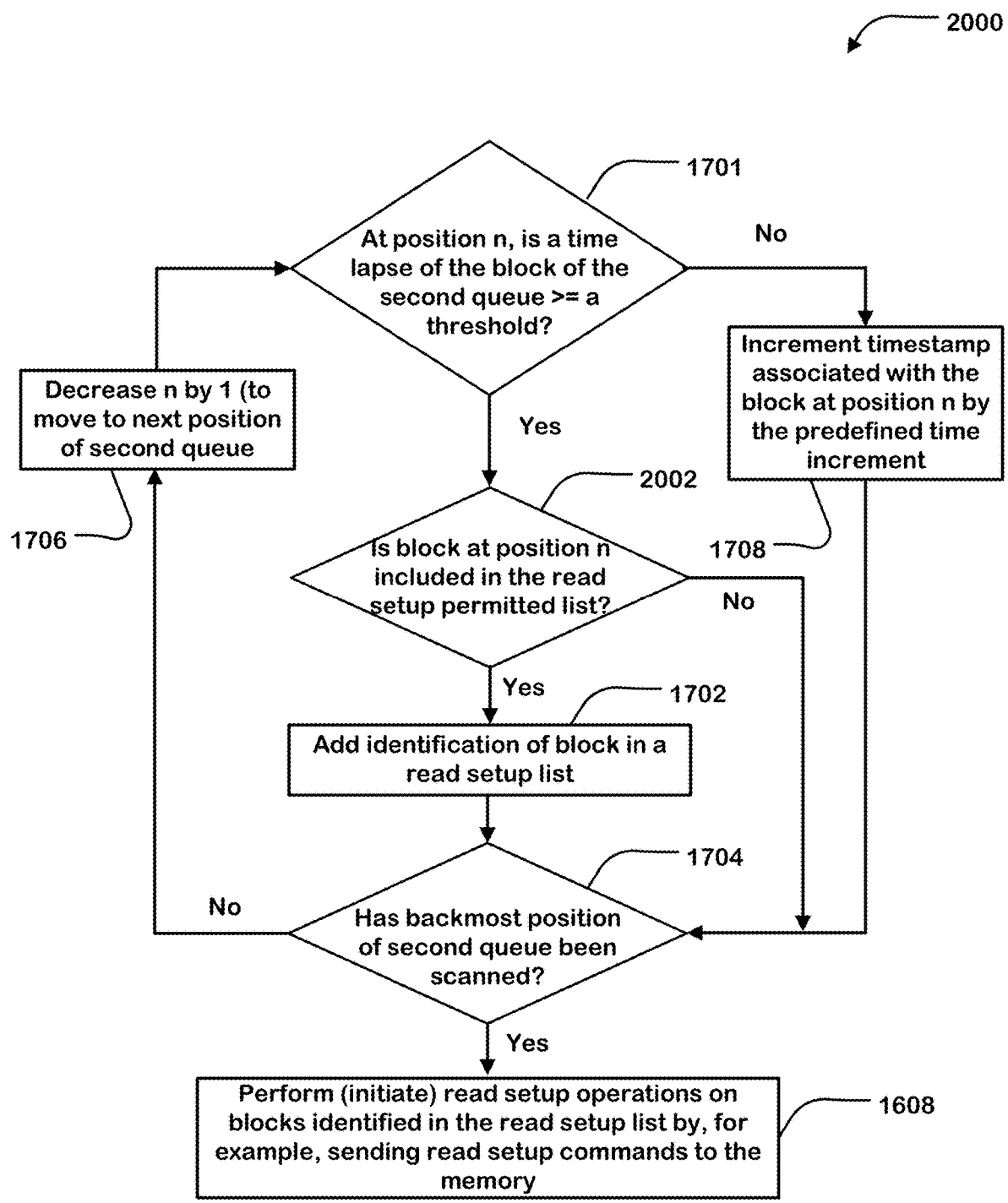
FIG. 13 illustrates a flow chart that describes identifying read candidate blocks of a flash memory using a read setup permitted list and performing read setup operations on the identified read candidate blocks, according to an embodiment of the technology disclosed.

FIG. 13 illustrates a flow chart that describes identifying read candidate blocks of a flash memory using a read setup permitted list and performing a read setup operations on the identified read candidate blocks, according to an embodiment of the technology disclosed.

Specifically, FIG. 13 illustrates a flow chart 2000 that is similar to the flow chart 1600 of FIG. 9. Each of operations 1701, 1702, 1704, 1706, 1708 and 1608 of flow chart 2000 are the same as described above with reference to FIG. 9. As such, redundant descriptions thereof are omitted.

Operation 2002 of FIG. 13 determines whether the block identified at position n is included in the read setup permitted list. Operations 1904 and 1906 of FIG. 12 describe adding a particular block to the read setup permitted list based on the usage of the block. If the block is identified in the read setup permitted list, then operation 1702 will add an identifier of the block to the read setup list. If the block is not identified in the read setup permitted list, operation 1704 will check to see if block n is as the backmost position of the second queue. The operations described in FIG. 13 can be performed after the operations of FIG. 12. As discussed with reference to FIG. 12, the blocks can be identified in the read setup permitted list based on their usage, such as ECC error count, PE count, etc.

Figure 14:
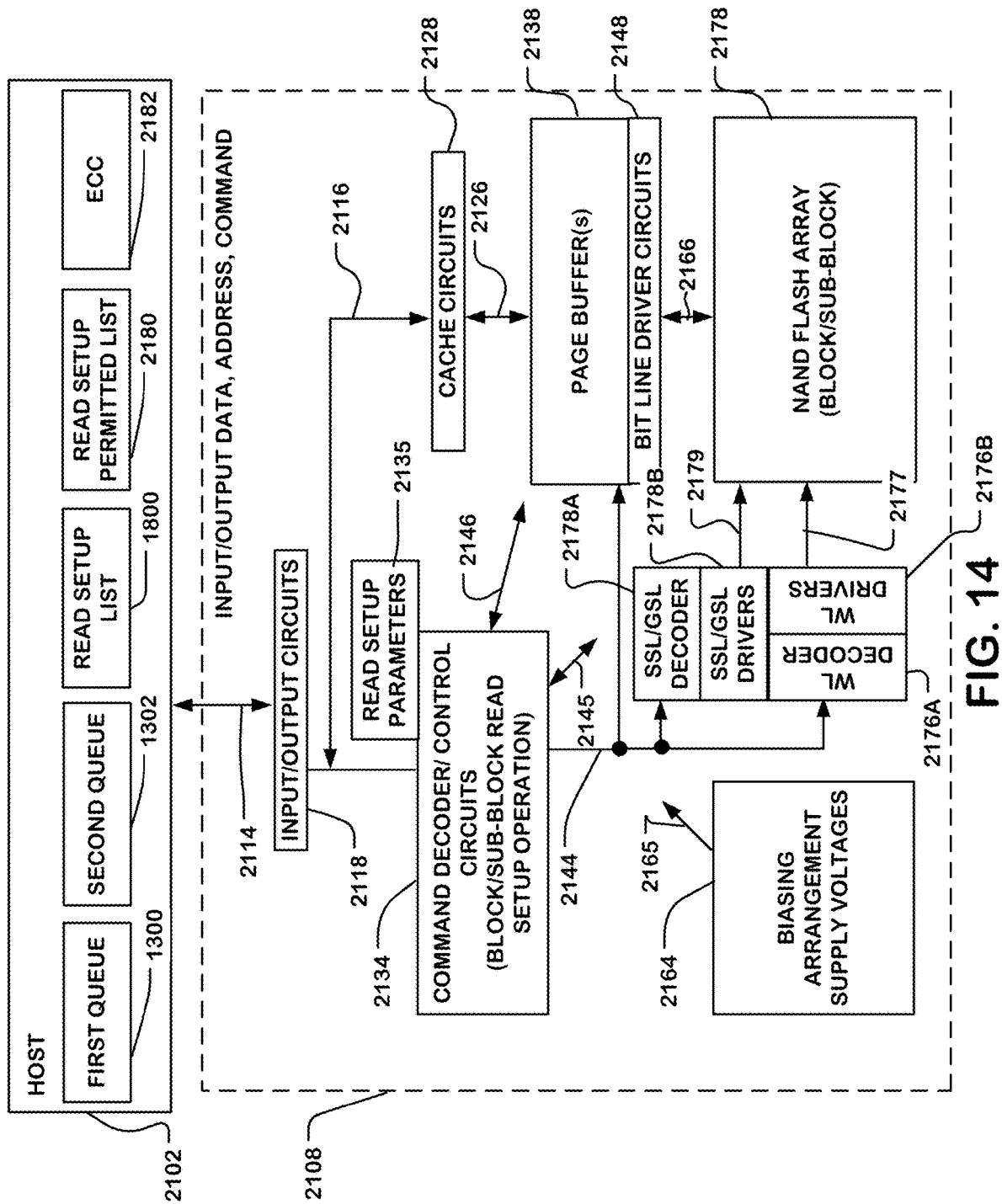
FIG. 14 is a block diagram of a memory system as described herein.

FIG. 14 is a simplified diagram of a memory system including a flash memory device 2108 implemented on an integrated circuit and a host 2102 including logic for issuing commands such as read commands, and program commands with addresses and data to be programmed. In some embodiments, the host can issue read setup commands to initiate read setup operations on the memory device 2108. The memory device 2108 can be implemented on a single integrated circuit chip, on a multichip module, or on a plurality of chips configured as suits a particular need.

The memory device 2108 in this example includes a memory array 2178 including a plurality of blocks as described above, each having a plurality of sub-blocks, on an integrated circuit substrate. The memory array 2178 can be a NAND flash memory implemented using two-dimensional or three-dimensional array technology.

In various embodiments, the memory device 2108 may have single-level cells (SLC), or multiple-level cells storing more than one bit per cell (e.g., MLC, TLC or XLC).

The memory device 2108 includes a memory array 2178, which can be a NAND flash memory implemented using three-dimensional array technology having one or multiple planes, each plane having multiple blocks, and each block having multiple sub-blocks.

A word line decoder 2176A is coupled via word line driver circuits 2176B to a plurality of word lines 2177 in the memory array 2178. SSL/GSL decoder 2178A is coupled via SSL/GSL driver circuits 2178B by SSL and GSL lines 2179, to bit line side (SSL) and common source side (GSL) string select gates in the array. Page buffer circuits 2138 are coupled by bit line driver circuits 2148 to bit lines 2166 in the memory array 2178. In some embodiments, column decoder circuits can be included for routing data from the bit line drivers to selected bit lines. The page buffer circuits 2138 can store pages of data that define a data pattern for a page program operation, and can include sensing circuits used in read and verify operations.

Bit lines for memory arrays can comprise global bit lines (GBL) and local bit lines. Bit lines generally comprise metal conductors in higher patterned layers that traverse a plurality of blocks of memory cells in an array. The global bit lines are connected to the NAND strings for current flow to and from the bit lines, which in turn are connected to the bit line driver circuits 2148 and page buffer circuits 2138. Likewise, the word lines can include global word lines and local word lines with corresponding supporting circuits 2176B in the word line drivers.

In a sensing operation, sensed data from the page buffer circuits 2138 are supplied via second data lines in bus system 2126 to cache circuits 2128, which are in turn coupled to input/output circuits 2118 via data path links 2116. Also, input data is applied in this example to the cache circuits 2128 on links 2116, and to the page buffer circuits 2138 on bus system 2126, for use in support of program operations.

Input/output circuits 2118 are connected by link 2114 (including I/O pads) and provide communication paths for the data, addresses and commands with destinations external to the memory device 2108, including the host 2102 in this example. The input/output circuits 2118 provide a communication path by link 2116 to cache circuits 2128 which support memory operations. The cache circuits 2128 are in data flow communication (using for example a bus system 2126) with page buffer circuits 2138.

Control circuits 2134 are connected to the input/output circuits 2118, and include command decoder logic, address counters, state machines, timing circuits and other logic circuits that control various memory operations, including program, read, and erase operations for the memory array 2178. Control circuit signals are distributed to circuits in the memory device, as shown by arrows 2145, 2146, as required to support the operations of the circuits. The control circuits 2134 can include address registers and the like for delivery of addresses as necessary to the components of the memory device 2108, including delivery to the cache circuits 2128 and, on link 2144, to the page buffer circuits 2138, word line decoder 2176A and SSL/GSL decoder 2178A in this illustration.

In the example shown in FIG. 14, control circuits 2134 include control logic circuits that include modules implementing a bias arrangement state machine, or machines, which controls, or control, the application of bias voltages generated or provided through the voltage supply or supplies in block 2164, including read setup, read, erase, verify and program voltages including precharge voltages, pass voltages and other bias voltages as described herein to word line driver circuits 2176B and bit line driver circuits 2148, for a set of selectable program, read setup and read operations. Bias voltages are applied as represented by arrow 2165, to components of the memory device 2108, as necessary for support of the operations.

The control circuits 2134 can include modules implemented using special-purpose logic circuitry including state machines, as known in the art. In alternative embodiments, the control circuits 2134 can include modules implemented using a general-purpose processor, which can be implemented on the same integrated circuit, which execute a computer program to control the operations of the memory device 2108. In yet other embodiments, a combination of special-purpose logic circuitry and a general-purpose processor can be utilized for implementation of modules in control circuits 2134.

The flash memory array 2178 can comprise floating gate memory cells or dielectric charge trapping memory cells configured to store multiple bits per cell, by the establishment of multiple program levels that correspond to amounts of charge stored, which in turn establish memory cell threshold voltages Vt. The technology can be used with single-bit-per-cell flash memory, and with other multiple-bit-per-cell and single-bit-per-cell memory technologies. In other examples, the memory cells may comprise programmable resistance memory cells, phase change memory cells, and other types of non-volatile and volatile memory cell technologies.

In the illustrated example, the host 2102 is coupled to links 2114 on the memory device 2108, as well as other control terminals not shown, such as chip select terminals and so on, and can provide commands or instructions to the memory device 2108. In some examples, the host 2102 can be coupled to the memory device using a serial bus technology, using shared address and data lines. The host 2102 can comprise a general purpose processor, a special purpose processor, a processor configured as a memory controller, or other processor that uses the memory device 2108. All or part of the host 2102 can be implemented on the same integrated circuit as the memory. The memory controller can execute some or all of the processes described with reference to FIGS. 6-13. Further, the host 2102 (e.g., the memory controller) can include an error correction code (ECC) circuit 2182. The ECC circuit 2182 can be used to carry out the operations discussed above with reference to, for example, FIG. 12. Specifically, for example, the ECC circuit 2182 can be used (using, e.g., ECC information) to identify blocks of memory for which a number of errors have been detected that is greater than (or equal to) the ECC threshold or the ECC circuit 2182 can be used to determine, for blocks of memory, whether a number of errors has been detected that is greater than (or equal to) an ECC threshold.

The host 2102 can update data stored in the memory based on requests from an application program. In general, the host 2102 can include programs that perform memory management functions including, in some embodiments, functions to control or support read setup operations as described herein. Other memory management functions can include, for example, managing the first and second queues, identifying read setup candidates, managing timestamps, managing the read setup list and the read setup permitted list, as well as managing information disclosed herewith related to the determination of the read setup candidate and operations associated therewith. Additional memory management functions can include wear leveling, bad block recovery, power loss recovery, garbage collection, error correction, and so on. Also, the host 2102 can include application programs, file systems, flash translation layer programs and other components that can produce status information for data stored in the memory, including issuing commands to program data having addresses and data to be programmed.

In the example illustrated in FIG. 14, the memory device includes a set of status registers 2135 to store parameters for read setup operations. The parameters can define the voltage levels to be applied, whether to turn on or off the string select and ground select gates, pulse durations and so on. Also, the parameters can include a starting plane and block address and a range of block addresses (or addresses of other read setup units) to be subject of a particular read setup operation. The parameters can include indicators for planes, and blocks within planes, and sub-blocks within blocks to be activated simultaneously for read setup operations. Some or all of parameters can be provided by read setup commands, and some or all can be stored as configuration data on the chip.

The host 2102 (e.g., the memory controller) can also include the first queue 1300, the second queue 1302, the read setup list 1800 and the read setup permitted list 2180. The host 2102 can implement the first queue 1300, the second queue 1302, the read setup list 1800 and the read setup permitted list 2180 in the various manners discussed herein. Alternatively, the memory device can include some or all of the first queue 1300, the second queue 1302, the read setup list 1800 and the read setup permitted list 2180 and the control circuits 2134, along with the read setup parameters 2135, can utilize some or all of the first queue 1300, the second queue 1302, the read setup list 1800 and the read setup permitted list 2180 to perform the read setup operations described herein.

A state machine on the memory device can access the read setup parameters, and execute a read setup operation including address generation and applying bias voltages to traverse the memory array to maintain read ready status across the memory. The operation can include a pattern of blocks in one plane or in multiple planes that can be subjected to the read setup operation simultaneously. The operation can be configured to traverse the array or parts of the array as a background operation, without external control. The operation can be configured to operate in response to read setup commands, carrying the read setup parameters and identifying segments of the array to be operated on by the read setup operation. The read setup commands can be generated by a memory controller in the host for example, which monitors block status, such as by identifying read setup candidate blocks and sending commends identifying the read setup candidate blocks for read setup operations, as well as identifying cold blocks in a wear leveling operation as stale blocks, and can send commands identifying stale blocks, or can send commands during time intervals in which the memory array is idle or expected to be idle. The state machine can set a ready/busy pin on the memory device to signal the control program on the memory controller for coordination of the read setup operations.

A technology is described herein that can execute read setup operations at high speed, and more often than available in prior technologies, thereby improving the memory cell operation window by maintaining the memory cells in condition for having thresholds as set during the program operation. These technologies are particularly beneficial in large high density memory systems. For example, if there are multiple sub-blocks in one block, all the sub-blocks of one block can be subject of the read setup operation simultaneously to improve the speed of the operation. Also, if there are multiple blocks in one memory plane, multiple blocks can be subject of the read setup operation simultaneously to improve the speed of the operation. Also, if there are multiple planes in one memory device, the read setup operation can be applied simultaneously to blocks or sub-blocks in the multiple planes to improve the speed of the operation.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A method of operating a memory, the method comprising:
    in response to an access of a block of memory:
        updating a first queue to identify the accessed block of memory in response to a determination that the accessed block of memory is not already identified in the first queue and a determination that the accessed block of memory is not already identified in a second queue; and
        updating the second queue to identify the accessed block of memory in response to a determination that the accessed block of memory is already identified in the first queue;
    scanning the second queue to identify, as a read setup candidate, each block of the memory that is identified as present in the second queue longer than a predetermined threshold; and
    performing a read setup operation on a block of the memory that has been identified as the read setup candidate.

2. The method of claim 1, further comprising, upon the second queue being updated to identify the accessed block of memory removing an identifier of the accessed block of memory from the first queue.

3. The method of claim 1, further comprising, in response to the access of the block of memory:
    updating a position of an identifier of the accessed block in the second queue in response to a determination that the accessed block of memory is not identified in the first queue and a determination that the accessed block of memory is already identified in the second queue.

4. The method of claim 1,
    wherein the second queue identifies a time counter that is (i) associated with a read setup candidate, (ii) set to an initial value upon an identifier of the read setup candidate being added to the second queue and (iii) incremented by a predetermined amount each time the scanning of the second queue is performed, and
    wherein the scanning of the second queue determines that the read setup candidate is identified as present in the second queue longer than the predetermined threshold when the value of the time counter associated with the read setup candidate is greater than the predetermined threshold.

5. The method of claim 1, wherein first queue is a first-in first-out (FIFO) queue.

6. The method of claim 1,
    wherein the second queue is a least recently used (LRU) queue that is a linked list, and
    wherein the updating of the second queue to identify the accessed block of memory updates linked list pointers of the second queue to (i) move positions of identifiers of other blocks of the memory identified in the second queue towards a front of the second queue and (ii) position the identifier of the accessed block of the memory at a backmost location of the second queue.

7. The method of claim 1, wherein the scanning of the second queue is periodically initiated according to a predetermined time interval.

8. The method of claim 1,
    wherein each respective identifier of the accessed blocks identified in the second queue is associated with a corresponding timestamp that is set relative to a time at which a corresponding block has been accessed, and
    wherein the scanning of the second queue comprises identifying a particular block of the memory, as identified in the second queue, as a read setup candidate when the timestamp of the particular block indicates that the particular block has been identified in the second queue longer than the predetermined threshold.

9. The method of claim 8, further comprising:
recording an identifier of the particular block identified as the read setup candidate in a read setup list; and
performing the read setup operation on one or more blocks identified in the read setup list including the particular block.

10. The method of claim 9,
wherein the scanning of the second queue is performed starting from a frontmost position of the second queue and proceeding, in order, to a backmost position of the second queue, and
wherein the performing of the read setup operation on the one or more blocks identified in the read setup list is performed after all positions of the second queue have been scanned.

11. The method of claim 1, further comprising:
maintaining a read setup permitted list to identify blocks of the memory for which a number of errors has been detected using an error correction code (ECC) that is greater than a predetermined ECC threshold;
determining which of the identified read setup candidates is listed in the read setup permitted list, prior to the performing of the read setup operation; and
performing the read setup operation only on the read setup candidates determined to be listed in the read setup permitted list.

12. The method of claim 1, further comprising:
maintaining a read setup permitted list to identify blocks of the memory that have been through a program and erase (PE) cycle a number of times that is greater than a predetermined PE cycle threshold;
determining which of the identified read setup candidates is listed in the read setup permitted list, prior to the performing of the read setup operation; and
performing the read setup operation only on the read setup candidates determined to be listed in the read setup permitted list.

13. The method of claim 1, further comprising:
in response to the access of the block of memory, detecting that a number of errors has been detected for the accessed block, using an error correction code (ECC), that is greater than a predetermined ECC threshold; and
identifying the accessed block of memory as the read setup candidate, regardless of whether the accessed block of memory is identified in the first queue or the second queue.

14. The method of claim 1, further comprising:
in response to the access of the block of memory, detecting that the accessed block has been through a program and erase (PE) cycle a number of times that is greater than a predetermined PE cycle threshold; and
identifying the accessed block of memory as the read setup candidate, regardless of whether the accessed block of memory is identified in the first queue or the second queue.

15. The method of claim 1, further comprising:
in response to the access of the block of memory, detecting that a number of errors has been detected for the accessed block, using an error correction code (ECC), that is greater than a predetermined ECC threshold; and
identifying the accessed block of memory as the read setup candidate during the scanning, regardless of whether the accessed block of memory is identified as present in the second queue longer than a predetermined threshold.

16. A memory controller for controlling a memory including a memory array, comprising a plurality of blocks, the memory controller comprising:
control circuits comprising logic to execute operations comprising:
in response to an access of a block of memory:
updating a first queue to identify the accessed block of memory in response to a determination that the accessed block of memory is not already identified in the first queue and a determination that the accessed block of memory is not already identified in a second queue; and
updating the second queue to identify the accessed block of memory in response to a determination that the accessed block of memory is already identified in the first queue;
scanning the second queue to identify, as a read setup candidate, each block of the memory that is identified as present in the second queue longer than a predetermined threshold; and
performing a read setup operation on a block of the memory that has been identified as the read setup candidate.

17. A method of operating a memory, the method comprising:
maintaining a read setup permitted list to identify blocks of the memory in dependence upon their use;
in response to an access of a block of the memory:
determining that the accessed block of the memory is included in the read setup permitted list; and
in response to the determination that the accessed block is included in the read setup permitted list, identifying the accessed block of the memory as a read setup candidate; and
performing a read setup operation on the accessed block of the memory that has been identified as the read setup candidate.

18. The method of claim 17, wherein the read setup permitted list identifies blocks of the memory for which a number of errors has been detected using an error correction code (ECC) that is greater than a predetermined ECC threshold.

19. The method of claim 17, wherein the read setup permitted list identifies blocks of the memory that have been through a program and erase (PE) cycle a number of times that is greater than a predetermined PE cycle threshold.

20. The method of claim 17, further comprising in response to the access of the block of memory:
updating a queue to identify the accessed block of memory in response to a determination that the accessed block of memory is not already identified in the queue and a determination that the accessed block of memory is not already identified in read setup permitted list;
updating the read setup permitted list to identify the accessed block of memory in response to a determination that the accessed block of memory is already identified in the queue; and
scanning the read setup permitted list to identify, as a read setup candidate, each block of the memory that is identified as present in the read setup permitted list longer than a predetermined threshold.

* * * * *